(12) United States Patent
Hua et al.

(10) Patent No.: US 11,368,648 B2
(45) Date of Patent: Jun. 21, 2022

(54) IMAGE STORAGE METHOD AND APPARATUS, AND ELECTRONIC DEVICE AND STORAGE MEDIUM

(71) Applicant: Hangzhou Hikvision Digital Technology Co., Ltd., Zhejiang (CN)

(72) Inventors: Congyi Hua, Zhejiang (CN); Shengguo Wang, Zhejiang (CN); Xianlin Zhao, Zhejiang (CN); Chuan Shen, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 58 days.

(21) Appl. No.: 17/050,128

(22) PCT Filed: Apr. 16, 2019

(86) PCT No.: PCT/CN2019/082858
§ 371 (c)(1),
(2) Date: Oct. 23, 2020

(87) PCT Pub. No.: WO2019/205986
PCT Pub. Date: Oct. 31, 2019

(65) Prior Publication Data
US 2021/0084256 A1     Mar. 18, 2021

(30) Foreign Application Priority Data
Apr. 25, 2018   (CN) .......................... 201810380171.X

(51) Int. Cl.
*H04N 5/91*    (2006.01)
*H04N 5/232*   (2006.01)
(Continued)

(52) U.S. Cl.
CPC .......... *H04N 5/91* (2013.01); *H04N 5/23229* (2013.01); *G06F 16/51* (2019.01); *G06T 5/006* (2013.01)

(58) Field of Classification Search
CPC ...... H04N 5/91; H04N 5/23229; G06T 5/006; G06T 1/0007; G06T 3/40; G06F 16/51
See application file for complete search history.

(56) References Cited

U.S. PATENT DOCUMENTS 10,412,327 B2 *   9/2019   Takahashi .......... H04N 5/37455
10,594,959 B2 *   3/2020   Kaehler .............. H04N 5/3535
(Continued)

FOREIGN PATENT DOCUMENTS

CN       1881234 A      12/2006
CN     101771796 A       7/2010
(Continued)

OTHER PUBLICATIONS

Wang, The Establishment of the Automatic Management System of Documents and Archives, Historical Archives Compilation and Research, 2013, vol. 5, No. 294, pp. 22-23, and its machine translation, 9 pages.

(Continued)

Primary Examiner — Hung H Lam
(74) Attorney, Agent, or Firm — Bret E. Field; Bozicevic, Field & Francis LLP

(57) ABSTRACT

Embodiments of the present application provide an image storage method and apparatus, and an electronic device and a storage medium. In the method, pixel data obtained by scanning with a first partial region of a scanning region is acquired as first pixel data, and the first pixel data is stored in a storage space; the first pixel data is corrected by using a preset correction algorithm to obtain second pixel data, and the second pixel data is stored in the storage space; if it is (Continued)

determined that the remaining space of the storage space meets the preset condition, the pixel data obtained by scanning with the remaining region of the scanning region is acquired as the third pixel data, and the third pixel data is stored in the storage space; wherein, the scanning mode of the remaining region is a preset second scanning mode; and the third pixel data is corrected by using the preset correction algorithm to obtain fourth pixel data, and the fourth pixel data is stored in the storage space. In the present application, due to the number of pixels obtained by scanning in the preset second scanning mode is less than the number of pixels obtained by scanning in the preset first scanning mode, the size of the image before correction is reduced, and thereby the success rate of image storage is improved.

15 Claims, 8 Drawing Sheets

(51) Int. Cl.
  *G06F 16/51* (2019.01)
  *G06T 5/00* (2006.01)

(56) References Cited

U.S. PATENT DOCUMENTS

| | | | | |
|---|---|---|---|---|
| 10,623,669 | B2* | 4/2020 | Sakane | H04N 5/345 |
| 10,728,439 | B2* | 7/2020 | Nakayama | H04N 5/378 |
| 11,178,406 | B2* | 11/2021 | Komiya | H04N 19/85 |
| 2007/0172230 | A1 | 7/2007 | Wernersson | |
| 2014/0328450 | A1 | 11/2014 | Pal et al. | |
| 2015/0070530 | A1* | 3/2015 | Tanaka | H04N 5/772 348/231.99 |
| 2015/0077590 | A1* | 3/2015 | Kuriyama | H04N 5/379 348/308 |

FOREIGN PATENT DOCUMENTS

| | | |
|---|---|---|
| CN | 102360427 A | 2/2012 |
| CN | 102831870 A | 12/2012 |
| CN | 103369192 A | 10/2013 |
| CN | 103946889 A | 7/2014 |
| CN | 104041002 A | 9/2014 |
| CN | 104077586 A | 10/2014 |
| CN | 106412374 A | 2/2017 |
| CN | 106534822 A | 3/2017 |
| CN | 104077586 B | 12/2017 |
| CN | 109087253 A | 12/2018 |
| KR | 20030016587 A | 3/2003 |

OTHER PUBLICATIONS

Selection of Digital Scanning Mode and Parameter Setting for Marine Scientific Research Archives, 2013, vol. 2, pp. 24-25.

* cited by examiner

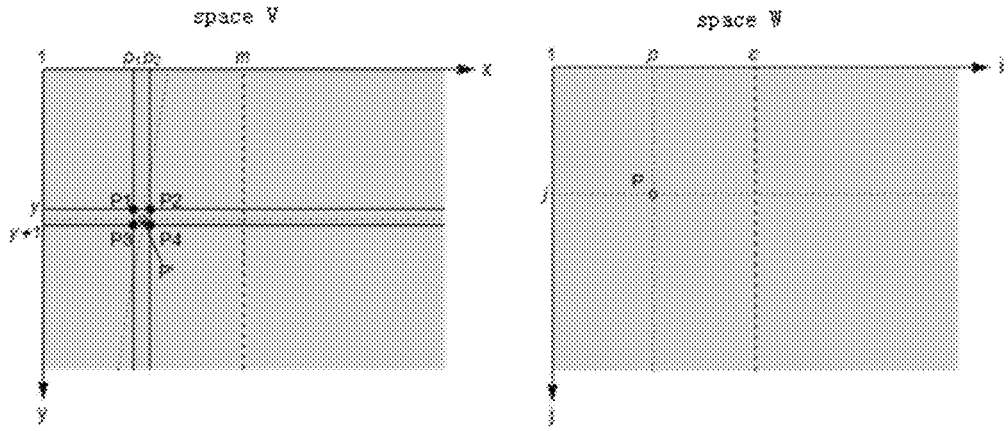

FIG.7

```
after acquiring the pixel data obtained by scanning with
the remaining region as fifth pixel data, the first space
occupied by storing the fifth pixel data is estimated, and     S1031
the second space occupied by storing the sixth pixel data
obtained after the fifth pixel data is corrected by the
preset correction algorithm is estimated; wherein, the
scanning mode of the remaining region is the preset first
scanning mode
```

↓

```
it is determined whether the remaining space of the
storage space is less than the sum of the first space and     S1032
the second space, and if the remaining space of the
storage space is less than the sum of the first space and
the second space, it is determined that the remaining
space of the storage space meets the preset condition
```

FIG.8

IMAGE STORAGE METHOD AND APPARATUS, AND ELECTRONIC DEVICE AND STORAGE MEDIUM

The present application claims the priority to a Chinese Patent Application No. 201810380171.X, filed with the China National Intellectual Property Administration on Apr. 25, 2018 and entitled "image storage method and apparatus, and electronic device and storage medium", which is incorporated herein by reference in its entirety.

TECHNICAL FIELD

The present invention relates to the technical field of image processing, and in particular to an image storage method and apparatus, and an electronic device and a storage medium.

BACKGROUND

Since an optical captor has the advantages of being able to withstand a certain degree of temperature change, good stability and relatively low cost, the optical captor has been widely used in the technical field of public safety.

However, affected by the optical imaging mechanism, the image obtained by scanning with the optical captor has trapezoidal distortion, which results in certain difficulties in the later recognition work. In order to eliminate the adverse effects of such trapezoidal distortion, it is usually necessary to correct the image obtained by scanning with the optical captor. The specific process includes: obtaining an image by scanning with an optical captor, storing the image, then correcting the stored image to obtain a corrected image, and then storing the corrected image. For example: a fingerprint image is obtained by scanning with the optical captor, the fingerprint image is stored, the fingerprint image is corrected to obtain a corrected fingerprint image and the corrected fingerprint image is stored.

Since storing the scanned image and the corrected image requires consuming storage space, when the storage space of the electronic device is small, it is impossible to store the scanned image and the corrected image at the same time.

SUMMARY

The objective of embodiments of the present application is to provide an image storage method and apparatus, and an electronic device and a storage medium, so as to improve the success rate of image storage. The specific technical solutions are as follows.

acquiring pixel data obtained by scanning with a first partial region of a scanning region as first pixel data, and storing the first pixel data in a storage space; wherein, a scanning mode of the first partial region is a preset first scanning mode;

correcting the first pixel data by using a preset correction algorithm to obtain second pixel data, and storing the second pixel data in the storage space;

determining whether the remaining space of the storage space meets a preset condition;

if the remaining space of the storage space meets the preset condition, acquiring the pixel data obtained by scanning with the remaining region of the scanning region as the third pixel data, and storing the third pixel data in the storage space; wherein, the remaining region is the region, other than the first partial region, in the scanning region; the scanning mode of the remaining region is a preset second scanning mode, and for the remaining region, the number of pixels obtained by scanning in the preset second scanning mode is less than the number of pixels obtained by scanning in the preset first scanning mode; and correcting the third pixel data by using the preset correction algorithm to obtain fourth pixel data, and storing the fourth pixel data in the storage space.

Optionally, the process of determining the first partial region of the scanning region includes:

determining the first partial region of the scanning region, based on preset correspondences between rows of pixels of the corrected image and rows of pixels of the image to be corrected and the second partial region in the preset corrected image;

wherein, the preset correspondences between the rows of pixels of the corrected image and the rows of pixels of the image to be corrected include: row mark correspondences between the rows of pixels of the corrected image and the rows of pixels of the image to be corrected, and scaling factors corresponding to the rows of pixels of the corrected image.

Optionally, the row mark correspondences between the rows of pixels of the corrected image and the rows of pixels of the image to be corrected are expressed by a preset formula, and the preset formula is:

if $y \leq j'\langle y+1, j$ corresponds to $y$;

wherein, y is the row mark of the y-th row of pixels in the image to be corrected, j is the row mark of the j-th row of pixels in the corrected image, and j' is the row mark of the row of pixels, in the image to be corrected, to which the j-th row of pixels in the corrected image is mapped.

Optionally, the step of determining the first partial region of the scanning region, based on preset correspondences between rows of pixels of the corrected image and rows of pixels of the image to be corrected and the second partial region in the preset corrected image include:

determining the row mark of the starting row of pixels of the first partial region of the scanning region based on the row mark correspondences and the row mark of the starting row of pixels of the second partial region in the preset corrected image;

determining the row mark of the ending row of pixels of the first partial region of the scanning region based on the row mark correspondences and the row mark of the ending row of pixels of the second partial region in the preset corrected image;

determining the column mark of the starting column of pixels of the first partial region of the scanning region, based on the scaling factors, the row mark of the ending row of pixels of the second partial region in the preset corrected image, the width of the second partial region in the preset corrected image, the column mark of the column of pixels where the symmetry axis, parallel to the ordinate axis, of the second partial region in the preset corrected image is located and the column mark of the starting column of pixels of the second partial region in the preset corrected image; wherein, the ordinate axis is the ordinate axis of the coordinate system where the preset corrected image is located;

determining the column mark of the ending column of pixels of the first partial region of the scanning region, based on the scaling factors, the row mark of the ending row of pixels of the second partial region in the preset corrected image, the width of the second partial region in the preset corrected image, the column mark of the column of pixels where the symmetry axis, parallel to the ordinate axis, of the second partial region in the preset corrected image is located and the column mark of the ending column of pixels of the second partial region in the preset corrected image.

Optionally, the step of correcting the first pixel data by using a preset correction algorithm to obtain second pixel data includes:

for each of pixels in the second partial region in the preset corrected image, determining a target pixel, in the first partial region of the scanning region, corresponding to the pixel, and determining a preset number of reference pixels at a preset distance from the target pixel;

calculating the pixel data of each of pixels as the second pixel data, by using a bilinear difference algorithm based on the pixel data of the preset number of the reference pixels; wherein, the pixel data includes a pixel value and a pixel position.

Optionally, the step of determining whether the remaining space of the storage space meets a preset condition includes:

acquiring the pixel data obtained by scanning with the remaining region as third pixel data, estimating the first space occupied by storing the third pixel data, and estimating the second space occupied by storing the fourth pixel data obtained after the third pixel data is corrected by the preset correction algorithm; wherein, the scanning mode of the remaining region is the preset first scanning mode;

determining whether the remaining space of the storage space is less than the sum of the first space and the second space;

if the remaining space of the storage space is less than the sum of the first space and the second space, determining that the remaining space of the storage space meets the preset condition.

Optionally, the step of determining whether the remaining space of the storage space meets a preset condition includes:

determining whether the row mark of the starting row of pixels of the second partial region in the preset corrected image is greater than the preset number of rows;

if the row mark of the starting row of pixels of the second partial region in the preset corrected image is greater than the preset number of rows, determining that the remaining space of the storage space meets the preset condition.

Optionally, if the remaining space of the storage space does not meet the preset condition, the method further includes:

acquiring the pixel data obtained by scanning with the remaining region of the scanning region as seventh pixel data, and storing the seventh pixel data in the storage space; wherein, the scanning mode of the remaining region is the preset first scanning mode;

correcting the seventh pixel data by using the preset correction algorithm to obtain eighth pixel data, and storing the eighth pixel data in the storage space.

Optionally, the process of determining the remaining region includes:

determining the remaining region, based on preset correspondences between rows of pixels of the corrected image and rows of pixels of the image to be corrected, the preset corrected image and the second partial region in the preset corrected image;

wherein, the preset correspondences between the rows of pixels of the corrected image and the rows of pixels of the image to be corrected include: row mark correspondences between the rows of pixels of the corrected image and the rows of pixels of the image to be corrected, and scaling factors corresponding to the rows of pixels of the corrected image.

Optionally, the step of determining the remaining region, based on preset correspondences between rows of pixels of the corrected image and rows of pixels of the image to be corrected, the preset corrected image and the second partial region in the preset corrected image includes:

determining the row mark of the starting row of pixels of the remaining region, based on the row mark correspondences, the row mark of the starting row of pixels of the second partial region in the preset corrected image, and the height of the second partial region in the preset corrected image;

determining the row mark of the ending row of pixels of the remaining region based on the row mark correspondences and the row mark of the ending row of pixels of the preset corrected image;

determining the column mark of the starting column of pixels of the remaining region, based on the scaling factors, the row mark of the ending row of pixels of the preset corrected image, the width of the preset corrected image, the column mark of the column of pixels where the symmetrical axis, parallel to the ordinate axis, of the preset corrected image is located, and the column mark of the starting column of pixels of the preset corrected image; wherein, the ordinate axis is the ordinate axis of the coordinate system where the preset corrected image is located;

determining the column mark of the ending column of pixels of the remaining region, based on the scaling factors, the row mark of the ending row of pixels of the preset corrected image, the width of the preset corrected image, the column mark of the column of pixels where the symmetrical axis, parallel to the ordinate axis, of the preset corrected image is located, and the column mark of the ending column of pixels of the preset corrected image.

An image storage apparatus includes:

an image capture module configured for scanning and capturing an image; and a processor configured for acquiring pixel data obtained by scanning with a first partial region of a scanning region as first pixel data, and storing the first pixel data in a storage space; wherein, a scanning mode of the first partial region is a preset first scanning mode; correcting the first pixel data by using a preset correction algorithm to obtain second pixel data, and storing the second pixel data in the storage space; determining whether the remaining space of the storage space meets a preset condition; if the remaining space of the storage space meets the preset condition, acquiring the pixel data obtained by scanning with the remaining region of the scanning region as third pixel data, and storing the third pixel data in the storage space; wherein, the remaining region is a region, other than the first partial region, in the scanning region; the scanning mode of the remaining region is a preset second scanning mode, and for the remaining region, the number of pixels obtained by scanning in the preset second scanning mode is less than the number of pixels obtained by scanning in the preset first scanning mode; correcting the third pixel data by using the preset correction algorithm to obtain fourth pixel data, and storing the fourth pixel data in the storage space.

Optionally, the processor includes:

a first pixel data acquisition module, configured for acquiring pixel data obtained by scanning with a first partial region of a scanning region as first pixel data, and storing the first pixel data in a storage space; wherein, a scanning mode of the first partial region is a preset first scanning mode;

a second pixel data determination module, configured for correcting the first pixel data by using a preset correction algorithm to obtain second pixel data, and storing the second pixel data in the storage space;

a judgment module, configured for determining whether the remaining space of the storage space meets a preset condition, and if the remaining space of the storage space meets the preset condition, triggering a third pixel data acquisition module;

the third pixel data acquisition module, configured for acquiring the pixel data obtained by scanning with the remaining region of the scanning region as the third pixel data, and storing the third pixel data in the storage space; wherein, the remaining region is the region, other than the first partial region, in the scanning region; the scanning mode of the remaining region is a preset second scanning mode, and for the remaining region, the number of pixels obtained by scanning in the preset second scanning mode is less than the number of pixels obtained by scanning in the preset first scanning mode; and a fourth pixel data determination module, configured for correcting the third pixel data by using the preset correction algorithm to obtain fourth pixel data, and storing the fourth pixel data in the storage space.

Optionally, the apparatus further includes a first determination module; the first determination module is configured for determining the first partial region in the scanning region, and the first determination module is specifically configured for:

determining the first partial region of the scanning region, based on preset correspondences between rows of pixels of the corrected image and rows of pixels of the image to be corrected and the second partial region in the preset corrected image;

wherein, the preset correspondences between the rows of pixels of the corrected image and the rows of pixels of the image to be corrected include: row mark correspondences between the rows of pixels of the corrected image and the rows of pixels of the image to be corrected, and scaling factors corresponding to the rows of pixels of the corrected image.

Optionally, the row mark correspondences between the rows of pixels of the corrected image and the rows of pixels of the image to be corrected are expressed by a preset formula, and the preset formula is:

if $y \leq j'(+1, j$ corresponds to $y$;

wherein, y is the row mark of the y-th row of pixels in the image to be corrected, j is the row mark of the j-th row of pixels in the corrected image, and j' is the row mark of the row of pixels, in the image to be corrected, to which the j-th row of pixels in the corrected image is mapped.

Optionally, the first determination module includes:

a first row mark of starting row of pixels determination unit, configured for determining the row mark of the starting row of pixels of the first partial region of the scanning region based on the row mark correspondences and the row mark of the starting row of pixels of the second partial region in the preset corrected image;

a first row mark of ending row of pixels determination unit, configured for determining the row mark of the ending row of pixels of the first partial region of the scanning region based on the row mark correspondences and the row mark of the ending row of pixels of the second partial region in the preset corrected image;

a first column mark of starting column of pixels determination unit, configured for determining the column mark of the starting column of pixels of the first partial region of the scanning region, based on the scaling factors, the row mark of the ending row of pixels of the second partial region in the preset corrected image, the width of the second partial region in the preset corrected image, the column mark of the column of pixels where the symmetry axis, parallel to the ordinate axis, of the second partial region in the preset corrected image is located and the column mark of the starting column of pixels of the second partial region in the preset corrected image; wherein, the ordinate axis is the ordinate axis of the coordinate system where the preset corrected image is located;

a first column mark of ending column of pixels determination unit, configured for determining the column mark of the ending column of pixels of the first partial region of the scanning region, based on the scaling factors, the row mark of the ending row of pixels of the second partial region in the preset corrected image, the width of the second partial region in the preset corrected image, the column mark of the column of pixels where the symmetry axis, parallel to the ordinate axis, of the second partial region in the preset corrected image is located and the column mark of the ending column of pixels of the second partial region in the preset corrected image.

Optionally, the second pixel data determination module includes:

a target pixel determination unit, configured for: for each of pixels in the second partial region in the preset corrected image, determining a target pixel, in the first partial region of the scanning region, corresponding to the pixel, and determining a preset number of reference pixels at a preset distance from the target pixel;

a second pixel data determination unit, configured for calculating the pixel data of each of pixels as the second pixel data, by using a bilinear difference algorithm based on the pixel data of the preset number of the reference pixels; wherein, the pixel data includes a pixel value and a pixel position.

Optionally, the judgment module includes:

an estimation unit, configured for acquiring the pixel data obtained by scanning with the remaining region as third pixel data, estimating the first space occupied by storing the third pixel data, and estimating the second space occupied by storing the fourth pixel data obtained after the third pixel data is corrected by the preset correction algorithm; wherein, the scanning mode of the remaining region is the preset first scanning mode;

a space judgment unit, configured for determining whether the remaining space of the storage space is less than the sum of the first space and the second space, and if the remaining space of the storage space is less than the sum of the first space and the second space, determining that the remaining space of the storage space meets the preset condition.

Optionally, the judgment module is specifically configured for:

determining whether the row mark of the starting row of pixels of the second partial region in the preset corrected image is greater than the preset number of rows, and if the row mark of the starting row of pixels of the second partial region in the preset corrected image is greater than the preset number of rows, determining that the remaining space of the storage space meets the preset condition.

Optionally, the apparatus further includes:

a seventh pixel data acquisition module, configured for: if the remaining space of the storage space does not meet the preset condition, acquiring the pixel data obtained by scanning with the remaining region of the scanning region as seventh pixel data, and storing the seventh pixel data in the storage space; wherein, the scanning mode of the remaining region is the preset first scanning mode;

an eighth pixel data determination module, configured for correcting the seventh pixel data by using the preset correction algorithm to obtain eighth pixel data, and storing the eighth pixel data in the storage space.

Optionally, the apparatus may further include a second determination module; the second determination module is configured for determining the remaining region, and the second determination module is specifically configured for:

determining the remaining region, based on preset correspondences between rows of pixels of the corrected image and rows of pixels of the image to be corrected, the preset corrected image and the second partial region in the preset corrected image;

wherein, the preset correspondences between the rows of pixels of the corrected image and the rows of pixels of the image to be corrected include: row mark correspondences between the rows of pixels of the corrected image and the rows of pixels of the image to be corrected, and scaling factors corresponding to the rows of pixels of the corrected image.

Optionally, the second determination module includes:

a second row mark of starting row of pixels determination unit, configured for determining the row mark of the starting row of pixels of the remaining region, based on the row mark correspondences, the row mark of the starting row of pixels of the second partial region in the preset corrected image, and the height of the second partial region in the preset corrected image;

a second row mark of ending row of pixels determination unit, configured for determining the row mark of the ending row of pixels of the remaining region based on the row mark correspondences and the row mark of the ending row of pixels of the preset corrected image;

a second column mark of starting column of pixels determination unit, configured for determining the column mark of the starting column of pixels of the remaining region, based on the scaling factors, the row mark of the ending row of pixels of the preset corrected image, the width of the preset corrected image, the column mark of the column of pixels where the symmetrical axis, parallel to the ordinate axis, of the preset corrected image is located, and the column mark of the starting column of pixels of the preset corrected image; wherein, the ordinate axis is the ordinate axis of the coordinate system where the preset corrected image is located;

a second column mark of ending column of pixels determination unit, configured for determining the column mark of the ending column of pixels of the remaining region, based on the scaling factors, the row mark of the ending row of pixels of the preset corrected image, the width of the preset corrected image, the column mark of the column of pixels where the symmetrical axis, parallel to the ordinate axis, of the preset corrected image is located, and the column mark of the ending column of pixels of the preset corrected image.

An electronic device includes: a processor and a memory; wherein, the memory is configured for storing a computer program;

the processor is configured for implementing the steps of the above any method when executing the computer program stored in the memory.

A computer readable storage medium stores a computer program; wherein, the computer program, when executed by a processor, causes the processor to implement the steps of the above any method.

An executable program code is configured for, when executed, performing the steps of the above any method.

In the embodiment of this application, pixel data obtained by scanning with a first partial region of a scanning region is acquired as first pixel data, and the first pixel data is stored in a storage space; wherein, a scanning mode of the first partial region is a preset first scanning mode; the first pixel data is corrected by using a preset correction algorithm to obtain second pixel data, and the second pixel data is stored in the storage space; it is determined whether the remaining space of the storage space meets a preset condition, and if the remaining space of the storage space meets the preset condition, the pixel data obtained by scanning with the remaining region of the scanning region is acquired as the third pixel data, and the third pixel data is stored in the storage space; wherein, the remaining region is the region, other than the first partial region, in the scanning region; the scanning mode of the remaining region is a preset second scanning mode, and for the remaining region, the number of pixels obtained by scanning in the preset second scanning mode is less than the number of pixels obtained by scanning in the preset first scanning mode; the third pixel data is corrected by using a preset correction algorithm to obtain fourth pixel data, and the fourth pixel data is stored in the storage space. In the present application, after storing the first pixel data obtained by scanning with the first partial region and the second pixel data obtained after correcting the first pixel data, it is determined whether the remaining storage space meets the preset condition; and if the remaining storage space meets the preset condition, the third pixel data obtained by scanning with the remaining region of the scanning region is acquired, and the third pixel data and the fourth pixel data obtained after correcting the third pixel data are stored. Since the scanning mode of the remaining region is the preset second scanning mode, and for the remaining region, the number of pixels obtained by scanning in the preset second scanning mode is less than the number of pixels obtained by scanning by using the preset first scanning mode, compared with the existing method, applying the solution of the embodiment of the present application, the size of the scanned image can be reduced, that is, the size of the image before correction, and thus the occurrence of image storage failure caused by insufficient storage space is reduced, and the success rate of image storage is improved.

BRIEF DESCRIPTION OF THE DRAWINGS

In order to more clearly describe the technical solutions of the embodiments of the present application and of the prior art, accompanying drawings that need to be used in embodiments and the prior art will be briefly described below. Obviously, accompanying drawings described below are only some of embodiments of the present application; those skilled in the art may also obtain other accompanying drawings based on these accompanying drawings without any creative efforts.

FIG. 7 is a schematic diagram of the determined target pixel and reference pixels provided by an embodiment of the present application.

FIG. 8 is a schematic flowchart of determining whether the remaining space of the storage space meets a preset condition provided by an embodiment of the present application.

DETAILED DESCRIPTION

In order to make the objective, technical solutions and advantages of the present application clearer and more understandable, the present application will be described in more detail below with reference to the accompanying drawings and embodiments. Obviously, the described embodiments are only some, and not all, of the embodiments of the present application. All other embodiments obtained based on the embodiments of the present application by those skilled in the art without any creative efforts fall into the scope of protection of the present application.

In order to solve the related technical problem, embodiments of the present application provide an image storage method and apparatus, and an electronic device and a storage medium.

In order to understand the solution more clearly, the application scenarios of the embodiments of the present application is firstly introduced below.

Figure 1:
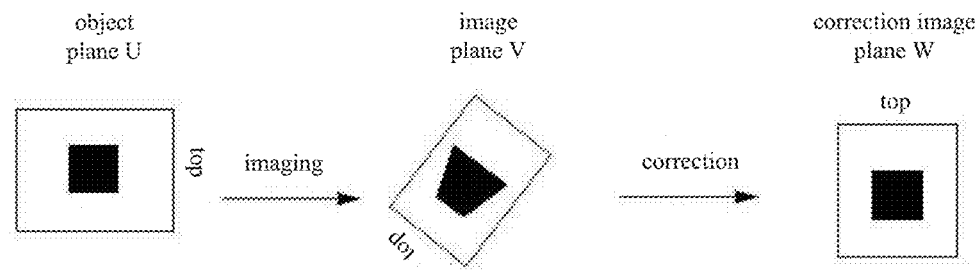
FIG. 1 is a schematic diagram of an application scenario provided by an embodiment of the present application.

Referring to FIG. 1, a plane where the object to be scanned by an image sensor is located is an object plane, denoted by U. The image sensor is provided with a scanning region for scanning the object to obtain pixel data. The pixel data includes pixel values. A plane where the object image scanned by the image sensor is located is an image plane, denoted by V. A plane where the image (corrected image) obtained by correcting the object image in the image plane is located is a correction image plane, denoted by W.

Figure 2:
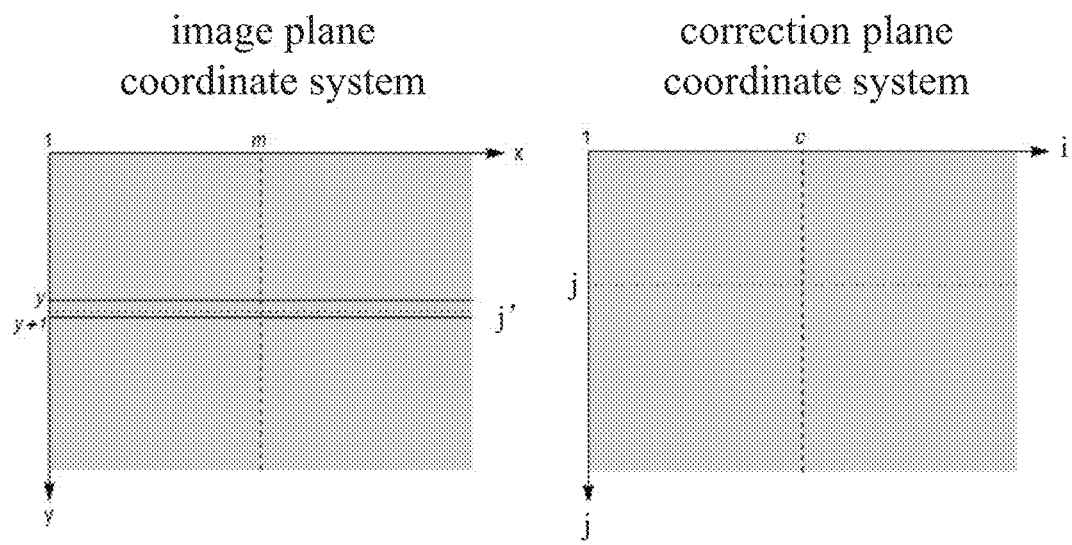
FIG. 2 is a schematic diagram of an image plane V and a correction image plane W provided by an embodiment of the application.

Referring to FIG. 2, the image plane coordinate system is established in the image plane V. It is provided that the coordinate of the pixel at the origin of the image plane coordinate system is (1, 1), the abscissa of the image plane coordinate system is represented by x, and x=1, 2, . . . , $x_0$, and the ordinate of the image plane coordinate system is represented by y, and y=1, 2, . . . , $y_0$. Correspondingly, a correction plane coordinate system is established in the correction image plane W. It is provided that the coordinate of the pixel at the origin of the correction plane coordinate system is (1, 1), the abscissa of the correction plane coordinate system is represented by i, and i=1, 2, . . . , $i_0$, and the ordinate of the correction plane coordinate system is represented by j, and j=1, 2, . . . , $j_0$. $x_0$ can be understood as the maximum value of the abscissa in the image plane coordinate system, and $y_0$ can be understood as the maximum value of the ordinate in the image plane coordinate system. $i_0$ can be understood as the maximum value of the abscissa in the calibration plane coordinate system, and $j_0$ can be understood as the maximum value of the ordinate in the calibration plane coordinate system.

In order to correct the object image in the image plane V to obtain the corrected image in the correction image plane W, it is necessary to establish a mapping relationship between the image plane V and the correction image plane W. The mapping relationship between the image plane V and the correction image plane W is a bidirectional mapping relationship, that is to say: the image in the image plane V can be mapped to the correction image plane W, and the image in the correction image plane W can be mapped to the image plane V. The process of establishing the mapping relationship is as follows.

1. The correspondence between the center line of the image plane coordinate system and the center line of the correction plane coordinate system is established.

Continuing to refer to FIG. 2, the center line of the image plane coordinate system is the center line of the shadow region of the image plane coordinate system in FIG. 2. The center line of the correction plane coordinate system is the center line of the shadow region of the correction plane coordinate system in FIG. 2. The center line of the image plane coordinate system and the center line of the correction plane coordinate system are in a mutual mapping relationship. The abscissa of the center line of the image plane coordinate system is represented by m, and the abscissa of the center line of the correction plane coordinate system is represented by c, that is to say: the center line with the abscissa m in the image plane coordinate system is mapped to the center line with the abscissa c in the correction plane coordinate system.

2. Row mark correspondences between rows of pixels in the image plane coordinate system and rows of pixels in the correction plane coordinate system are established.

In the embodiment of the present application, the rows of pixels are pixel rows, and columns of pixels are pixel columns.

Continuing to refer to FIG. 2, for the j-th row of pixels in the correction plane coordinate system, it is assumed that the j-th row of pixels are mapped to the j'-th row of pixels in the image plane coordinate system.

If the j'-th row of pixels are between the y-th row of pixels and the y+1-th row of pixels, including the case where the j'-th row of pixels are in the y-th row of pixels, the j-th row of pixels in the correction plane coordinate system corresponds to the y-th row of pixels in the image plane coordinate system. That is, the row mark of the j-th row of pixels corresponds to the row mark of the y-th row of pixels, and the correspondence is stored in the array JToY. Wherein, JToY is the row mark correspondences, JToY[j] represents the row mark of the row of pixels, corresponding to the row mark of the j-th row of pixels in the correction plane coordinate system, in the image plane coordinate system, and the number of elements in the array JToY is $j_0$.

3. Distance correspondences between the rows of pixels in the image plane coordinate system and the rows of pixels in the correction plane coordinate system are established.

The distance between the j'-th row of pixels and the y+1-th row of pixels is $dy_j$, that is, the j-th row of pixels corresponds to $dy_j$, and the correspondence is stored in the array DY. Wherein, DY[j]: represents the distance, corresponding to the j-th row of pixels in the correction plane coordinate system, in the image plane coordinate system, the number of elements in the array DY is $j_0$, and the values of these $j_0$ elements are not necessarily the same. That is to say, the distance corresponding to each row of pixels in the correction plane coordinate system is not necessarily the same.

4. Scaling correspondences between the rows of pixels in the image plane coordinate system and the rows of pixels in the correction plane coordinate system are established.

Figure 3:
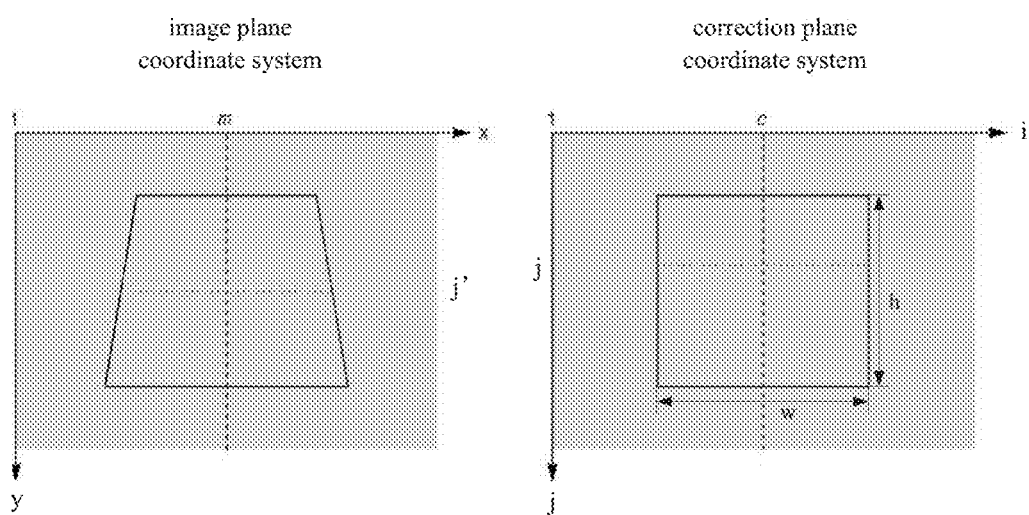
FIG. 3 is a schematic diagram of trapezoidal distortion provided by an embodiment of the application.

Referring to FIG. 3, based on the principle of trapezoidal distortion, any trapezoid, in the image plane coordinate system, whose one base is parallel to the abscissa axis of the image plane coordinate system and that is symmetric about the center line m is mapped to a rectangle, in the correction plane coordinate system, whose one side is parallel to the abscissa axis of the correction plane coordinate system and that is symmetric about the center line c; any rectangle, in the calibration plane coordinate system, whose one side is parallel to the abscissa axis of the calibration plane coordinate system and that is symmetric about the center line c is mapped to a trapezoid, in the image plane coordinate system, whose one base is parallel to the abscissa axis of the image plane coordinate system and that is symmetric about the center line m.

Generally, due to factors such as memory size and usage restriction, the object image in the obtained image plane coordinate system will not occupy the entire image plane coordinate system, and the corrected image obtained by mapping the object image to the correction plane coordinate system will also not occupy the entire correction plane coordinate system. Therefore, continuing to refer to FIG. 3, a preset corrected image is defined in the correction plane coordinate system herein. The preset corrected image is a rectangular region, the width of the preset corrected image is w, the height of the preset corrected image is h, and the number of image pixels in the preset corrected image is: w×h; and the symmetry axis, of the preset corrected image, that is parallel to the columns of pixels of the correction plane coordinate system where the preset corrected image is located coincides with the center line of the correction plane coordinate system.

There are multiple symmetry axes of the correction plane coordinate system. What is mentioned here is the symmetry axis parallel to the columns of pixels, or to say the symmetry axis parallel to the ordinate axis of the coordinate system.

It is assumed that the row mark of the starting row of pixels of the preset corrected image is $j_{Top}$, and the height of the preset corrected image is h, thus, the row mark of the ending row of pixels thereof is $j_{Bot}$, wherein $j_{Bot}=j_{Top}+h-1$.

The preset corrected image is mapped to a trapezoidal region in the image plane coordinate system, the row mark of the starting row of pixels of the trapezoidal region is $i_{Top}$, and the row mark of the ending row of pixels of the trapezoidal region is $j_{Bot}$, wherein $y_{Top}=JtoY[j_{Top}], y_{Bot}=JtoY[j_{Bot}]+1$. And all the pixels between the two rows, $y_{Top}$-th and $y_{Bot}$-throws, of pixels, the $y_{Top}$-throw of pixels, and the $y_{Bot}$-throw of pixels include all the pixels of the object image that need to be corrected.

Due to the existence of the trapezoidal distortion, the line segments with the same length in the correction plane coordinate system are mapped to the line segments with different lengths in the image plane coordinate system. Therefore, there is a scaling factor for corresponding each row of pixels in the correction plane coordinate system to each row of pixels in the image plane coordinate system; and the correspondence between each row of pixels in the correction plane coordinate system and the scaling factor is stored in an array Scale. Wherein, Scale is the scaling factors, Scale[j] represents the line segment, in the image plane coordinate system, corresponding to the line segment where the j-th row of pixels of the preset corrected image in the correction plane coordinate system is located, and the number of elements in the array JToY is $j_0$.

In order to reduce the occurrence of image storage failures caused by insufficient storage space in the related art, in the embodiment of the present application, "acquiring the image-storing the image-correcting the image-storing the image" is performed twice. The scanning region includes the first partial region and the remaining region except the first partial region. The first pixel data of the first partial region is acquired for the first time. The third pixel data of the remaining region is acquired for the second time. Therefore, through the twice acquisitions, the image obtained by scanning with the scanning region is completely acquired.

Referring to FIG. 1, the first partial region in the scanning region can be understood as the black rectangular region in the object plane U in FIG. 1. The black rectangular region is mapped to a black trapezoidal region in the image plane V; the black trapezoidal region is mapped to a black rectangular region in the correction image plane W; the black rectangular region in the correction image plane W can be understood as the second partial region in the preset corrected image. The starting row of pixels of the second partial region is the starting row of pixels of the preset corrected image, and the width of the second partial region is the width w of the preset corrected image.

In the embodiment of the present application, the process of performing twice "acquiring the image-storing the image-correcting the image-storing the image" is: acquiring first pixel data obtained by scanning with the first partial region of the scanning region and storing the first pixel data-correcting the first pixel data to obtain second pixel data and storing the second pixel data-acquiring third pixel data obtained by scanning with the remaining region except the first partial region and storing the third pixel data-correcting the third pixel data to obtain fourth pixel data and storing the fourth pixel data.

An image storage method provided by an embodiment of the present application is firstly introduced below.

Figure 4:
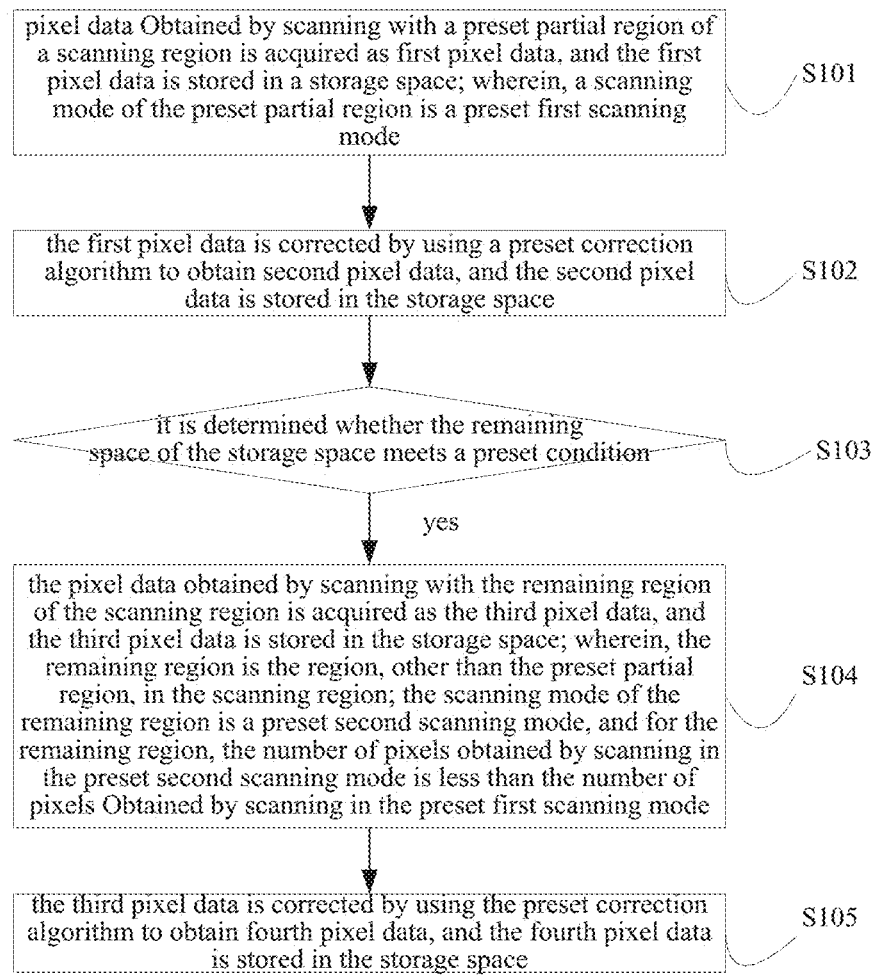
FIG. 4 is a first schematic flowchart of an image storage method provided by an embodiment of the present application.

As shown in FIG. 4, the image storage method provided by an embodiment of the present application may include the following steps.

At S101, pixel data obtained by scanning with a first partial region of a scanning region is acquired as first pixel data, and the first pixel data is stored in a storage space; wherein, a scanning mode of the first partial region is a preset first scanning mode.

As described above, referring to FIG. 1, the first partial region in the scanning region can be understood as the black rectangular region in the object plane U in FIG. 1; the second partial region in the preset corrected image can be understood as the black rectangular region in the correction image plane W.

After the mapping relationship between the image plane V and the correction image plane W is determined, the first partial region of the scanning region may be determined based on the mapping relationship.

Wherein, the process of determining the first partial region of the scanning region may include:

determining the first partial region of the scanning region, based on preset correspondences between rows of pixels of the preset corrected image and rows of pixels of the image to be corrected and the second partial region in the preset corrected image;

wherein, the preset correspondences include: row mark correspondences between the rows of pixels of the preset corrected image and the rows of pixels of the image to be corrected, and scaling factors between the rows of pixels of the preset corrected image and the rows of pixels of the image to be corrected.

Since the corrected image is in the correction plane coordinate system, and the image to be corrected is in the image plane coordinate system, the row mark correspondences between the rows of pixels of the corrected image and the rows of pixels of the image to be corrected are the row mark correspondences between the rows of pixels of the image plane coordinate system and the rows of pixels of the correction plane coordinate system. The scaling factors are the scaling correspondences between the rows of pixels of the image plane coordinate system and the rows of pixels of the correction plane coordinate system.

Since there are correspondences between the rows of pixels of the corrected image and the rows of pixels of the image to be corrected, based on the preset correspondences between the rows of pixels of the corrected image and the rows of pixels of the image to be corrected, and the second partial region in the preset corrected image, the first partial region, of the scanning region in the image plane coordinate system, corresponding to the second partial region in the correction plane coordinate system can be determined.

Exemplarily, the row mark correspondences between the rows of pixels of the corrected image and the rows of pixels of the image to be corrected are expressed by a preset formula, and the preset formula may be that:

if $y \le j'\langle y+1$, $j$ corresponds to $y$;

wherein, y is the row mark of the y-th row of pixels in the image to be corrected, j is the row mark of the j-th row of pixels in the corrected image, and j' is the row mark of the row of pixels, in the image to be corrected, to which the j-th row of pixels in the corrected image is mapped.

Figure 5:
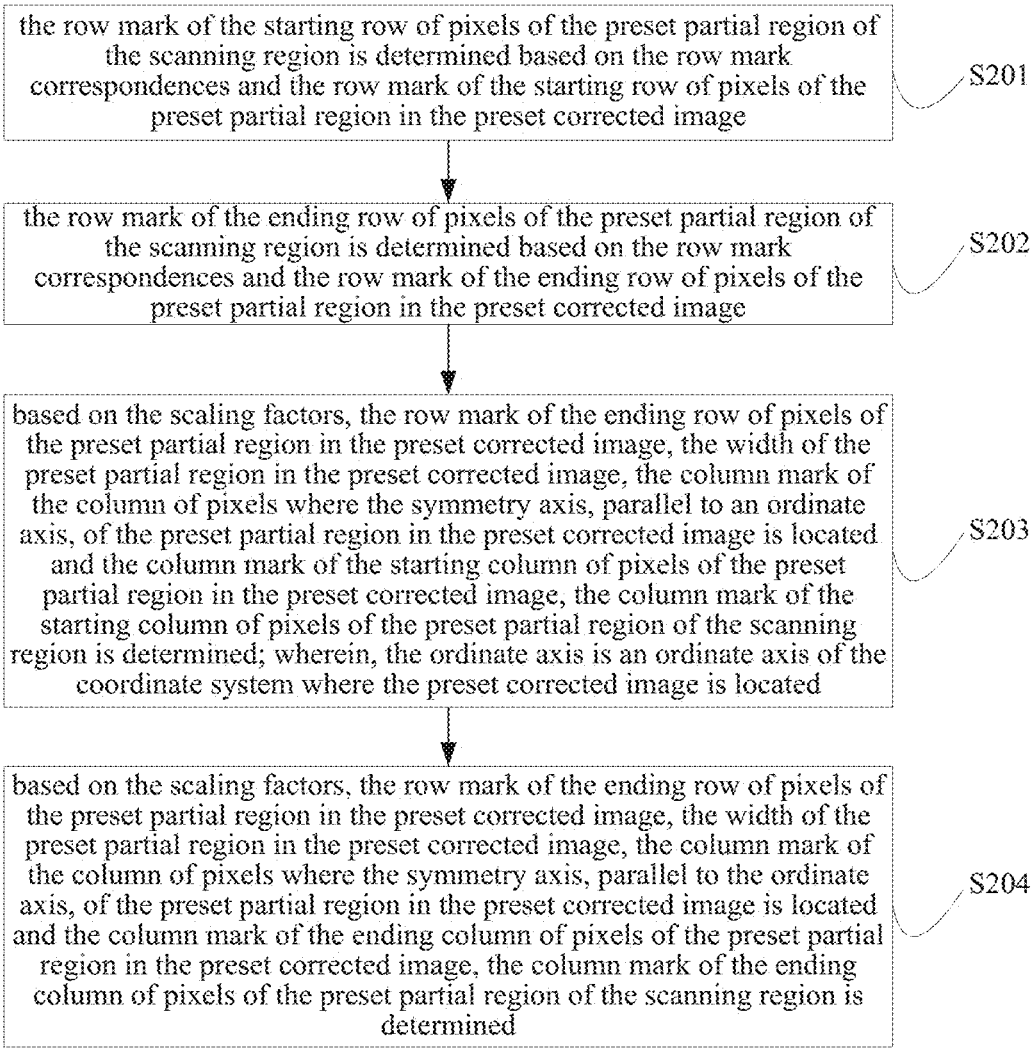
FIG. 5 is a schematic flowchart of determining the first partial region of the scanning region provided by an embodiment of the present application.

In an implementation, referring to FIG. 5, determining the first partial region of the scanning region, based on the preset correspondences between rows of pixels of the preset corrected image and rows of pixels of the image to be corrected and the second partial region in the preset corrected image may include the following steps.

At S201, the row mark of the starting row of pixels of the first partial region of the scanning region is determined based on the row mark correspondences and the row mark of the starting row of pixels of the second partial region in the preset corrected image.

In order to determine the first partial region of the scanning region, it is necessary to determine the starting row, the ending row, the starting column and the ending column of the first partial region. Of course, it is also possible to determine the starting row, the height, the starting column and the width of the first partial region. The both are possible. There may be many ways to determine the first partial region. Determining the first partial region by determining the starting row, the ending row, the starting column and the ending column of the first partial region will be described below.

Since the correspondence between the row mark of the j-th row of pixels in the correction plane coordinate system and the row mark of the y-th row of pixels in the image plane coordinate system is stored in an array JToY, the row mark of the starting row of pixels of the first partial region may be determined by the following formulas:

$$T1 = JtoY[j_{Top}]$$

wherein, T1 is the row mark of the starting row of pixels of the first partial region of the scanning region, JToY is the row mark correspondences, and $j_{Top}$ is the row mark of the starting row of pixels of the second partial region in the preset corrected image.

Since the starting row of pixels of the second partial region in the preset corrected image are the starting row of pixels of the preset corrected image, and the preset corrected image is known, therefore, the row mark of the starting row of pixels of the second partial region is marked is $j_{Top}$.

At S202, the row mark of the ending row of pixels of the first partial region of the scanning region is determined based on the row mark correspondences and the row mark of the ending row of pixels of the second partial region.

Similarly, the row mark of the ending row of pixels of the first partial region is determined by the following formula:

$$T_{Int} = JtoY[j_{Int}] + 1$$

wherein, $T_{Int}$ is the row mark of the ending row of pixels of the first partial region, JtoY is the row mark correspondences, and $j_{Int}$ is the row mark of the ending row of pixels of the second partial region.

The method of determining the row mark $j_{Int}$ of the ending row of pixels of the second partial region in the preset corrected image is described below.

After the image sensor scans the object image, the image sensor needs to store the object image in the storage space, and corrects the object image to obtain the corrected image, and then stores also the corrected image in the storage space. In the embodiment of the present application, it is assumed that the size of the storage space for storing images is constant ImgBytes bytes.

Two pointers pIn and pOut with 1 byte as the step size are set; wherein, pIn is configured for marking the head address of the storage location, in the storage space, of the image scanned by the image sensor, and pOut is configured for marking the head address of the storage location, in the storage space, of the corrected image obtained after the object image is corrected.

Also, when the first image scanning is not performed, pOut points to the location of the start address of the storage space and pIn points to the location of pOut+GapBytes of the storage space; wherein, GapBytes is the location difference (in bytes) between pOut and pIn. If GapBytes is not set, it may be caused that the uncorrected scanning region is covered during correcting the image. At this time, the correction of the image will not be completed. Therefore, the setting of GapBytes avoids the coverage of the image and ensures the smooth progress of the correction.

Exemplarily, GapBytes is determined in the following way.

it is set that GapBytes=w the following steps are performed cyclically for $j=j_{Top}$, $j_{Top}+1, \ldots, j_{Bot}$:

if $JtoY[j] == JtoY[j+1]$, GapBytes=GapBytes+w wherein, GapBytes is the location difference between pOut and pIn, w is the width of the second partial region in the preset corrected image, $j_{Top}$ is the row mark of the starting row of pixels of the second partial region, $j_{Bot}$ is the row mark of the ending row of pixels of the preset corrected image, j is the j-th row of pixels of the preset corrected image, JtoY is the row mark correspondences.

There are many ways to determine the row mark of the ending row of pixels of the second partial region, including but not limited to the following ways.

The first way:
the row mark of the ending row of pixels of the second partial region is calculated by the following formula:

$$\text{Width}(j_{Int}) \times (y_{Int} - y_{Top} + 1) =$$
$$\text{Width}(j_{Int}) \times (JtoY[j_{Int}] + 1 - JtoY[j_{Top}] + 1) \leq ImgBytes - GapBytes$$

In the above formula, Width($j_{Int}$)=R($j_{Int}$)−L($j_{Int}$)+1

$$L(j_{Int}) = \max(1, A1)$$

$$A1 = \text{floor}(m - \text{Scale}[j_{Int}]*(c-a))$$

$$R(j_{Int}) = \min(x_0, B1+1)$$

$$B1 = \text{floor}(m + \text{Scale}[j_{Int}]*(b-c)) + 1$$

wherein, Width($j_{Int}$) is the width of the row of pixels, in the image plane coordinate system, to which the ending row of pixels of the second partial region is mapped; $j_{Int}$ is the row mark of the ending row of pixels of the second partial region; $y_{Int}$ is the row mark of the ending row of pixels of the first partial region of the scanning region; $y_{Top}$ is the row mark of the starting row of pixels of the first partial region; JtoY is the row mark correspondences; $j_{Top}$ is the row mark of the starting row of pixels in the second partial region; ImgBytes−GapBytes is the size of the storage space for storing the image scanned by the scanning region and the corrected image; R($j_{Int}$) is the column mark of the ending column of pixels of the first partial region; L($j_{Int}$) is the column mark of the starting column of pixels of the first partial region; floor is a round-down function, that is, floor(k) the maximum integer not greater than k; Scale is the scaling factors; A1 is the abscissa closest to the first left intersection pixel, A1 is an integer, and the first left intersection pixel is the intersection pixel with the minimum abscissa in the two intersection pixels where the ending row of pixels of the first partial region intersect the scanning region; B1 is the abscissa of the pixel closest to the first right intersection, B1 is an integer, and the first right intersection pixel is the intersection pixel with the maximum abscissa in the two intersection pixels where the ending row of pixels intersect the scanning region; $x_0$ is the column pixel corresponding to the maximum abscissa of the image plane coordinate system; m is the column mark of the column of pixels, in the scanning region, to which the symmetry axis, parallel to the columns of pixels, of the preset corrected image is mapped; c is the column mark of the column of pixels where the symmetry axis, parallel to the columns of pixels, of the preset corrected image is located; a is the column mark of the starting column of pixels of the preset corrected image; and b is the column mark of the ending column of pixels of the preset corrected image.

The second way: the row mark of the ending row of pixels of the second partial region is determined by a binary search method.

The process of the binary search method is:
calculating the height of the second partial region:

$$h1 = j_{Int} - j_{Top} + 1$$

wherein, h1 is the height of the second partial region, $j_{Int}$ is the row mark of the ending row of pixels of the second partial region, and $j_{Top}$ is the row mark of the starting row of pixels of the second partial region.

Since $j_{Top}$ is a known quantity, the value of h1 does not strictly monotonically decrease with respect to the value of $j_{Top}$. Therefore, in order to solve $j_{Int}$, it is needed to determine h1.

In the case where the width w of the second partial region and the size ImgBytes of the storage space are known, h1Max and h1Min are also fixed values; h1Max is the maximum value that h1 can take, and h1Min is the minimum value that h1 can take; since the value of h1 is between h1Max and h1Min, the row mark of the ending row of pixels of the second partial region may be determined in the following way:

$$j_{Int1} = j_{Top} + h1\text{Min} - 1$$

$$j_{Int2} = j_{Top} + h1\text{Max}$$

wherein, $j_{Int1}$ is less than or equal to the minimum value that $j_{Int}$ may take, and $j_{Int2}$ is greater than the maximum value that $j_{Int}$ may take.

The following steps are performed cyclically for i=1, 2, . . . , $j_0$:

$$j_{Int} = (j_{Int1} + j_{Int2})/2$$

$$y_{Int} = JtoY[j_{Int}] + 1$$

if Width($j_{Int}$)×($j_{Int} - y_{Top} + 1$) ⟩ ImgBytes−GapBytes then $j_{Int2} = j_{Int}$ otherwise, $j_{Int1} = j_{Int}$ if $j_{Int1} \geq j_{Int2} - 1$, $j_{Int} = j_{Int1}$ and the circulation ends, wherein, i is the i-th column of pixels of the preset corrected image; $j_0$ is the row of pixels corresponding to the maximum ordinate of the correction plane coordinate system; $y_{Int}$ is the row mark of the ending row of pixels of the first partial region of the scanning region; $y_{Top}$ is the row mark of the starting row of pixels of the first partial region; JtoY is the row mark correspondences; Width($j_{Int}$) is the width of the row of pixels, in the image plane coordinate system, to which the ending row of pixels of the second partial region in the preset corrected image is mapped; ImgBytes−GapBytes is the size of the storage space for storing the image scanned by the scanning region and the corrected image.

Therefore, the row mark of the ending row of pixels of the second partial region may be calculated.

Exemplarily, in the case where the width w of the second partial region and the size ImgBytes of the storage space are known, the h1Max and h1Min may be calculated by the following formulas:

it is set that h1Max=$j_0$ the following steps are performed cyclically for i=1, 2, . . . , h:

if $$(JtoY[i]+1-JtoY[1]+1) \times \text{floor}(\text{Scale}[i] \times w + 2) \leq \text{ImgBytes} - \text{GapBytes}$$

and $$(JtoY[i+1]+1-JtoY[1+1]) \times \text{floor}(\text{Scale}[i+1] \times w + 2) \rangle \text{ImgBytes} - \text{GapBytes},$$

h1Max=i and the circulation exits,
it is set that h1Min=0
the following steps are performed cyclically for i=1, 2, ..., h:
if $$(JtoY[j_0-h+i]+1-JtoY[j_0-h+1]+1) \times \text{floor}(\text{Scale}[j_0-h+i] \times w+2) \leq \text{ImgBytes} - \text{GapBytes}$$

and $$(JtoY[j_0-h+i+1]+1-JtoY[j_0-h+1]+1) \times \text{floor}(\text{Scale}[j_0-h+i+1] \times w+2) \rangle \text{ImgBytes} - \text{GapBytes},$$

h1Min=i and the circulation exits.

Wherein, h1Max is the maximum value that h1 can take; h1Min is the minimum value that h1 can take; $j_0$ is the row of pixels corresponding to the maximum ordinate of the correction plane coordinate system; i is the i-th column of pixels of the preset corrected image; h is the height of the preset corrected image; JtoY is the row mark correspondences; floor is the round-down function; w is the width of the second partial region in the preset corrected image; and Scale is the scaling factors.

At S203, based on the scaling factors, the row mark of the ending row of pixels of the second partial region, the width of the second partial region, the column mark of the column of pixels where the symmetry axis, parallel to the columns of pixels, of the second partial region is located and the column mark of the starting column of pixels of the second partial region, the column mark of the starting column of pixels of the first partial region of the scanning region is determined.

There are multiple symmetry axes of the second partial region. What is mentioned here is the symmetry axis parallel to the columns of pixels, or to say the symmetry axis parallel to the ordinate axis of the coordinate system; wherein, the ordinate axis is an ordinate axis of the coordinate system where the preset corrected image is located.

The column mark of the starting column of pixels of the first partial region of the scanning region is calculated by the following formulas:

$$L1 = \max(1, A1)$$

$$A1 = \text{floor}(m - \text{Scale}[j_{Int}] \times (c-a))$$

wherein, L1 is the column mark of the starting column of pixels of the first partial region of the scanning region; floor is the round-down function, that is, floor(k) is the maximum integer not greater than k; Scale is the scaling factors; $j_{Int}$ is the row mark of the ending row of pixels of the second partial region in the preset corrected image; A1 is the abscissa closest to a first left intersection pixel; A1 is an integer, and the first left intersection pixel is the intersection pixel with the minimum abscissa in the two intersection pixels where the ending row of pixels of the first partial region intersect the scanning region; m is the column mark of the column of pixels, in the scanning region, to which the symmetry axis, parallel to the ordinate axis, of the preset corrected image is mapped; c is the column mark of the column of pixels where the symmetrical axis, parallel to the ordinate axis, of the preset corrected image is located; a is the column mark of the starting column of pixels of the preset corrected image; and (c−a) is the half of width of the preset corrected image.

Wherein, the ordinate axis is the ordinate axis of the coordinate system where the preset corrected image is located, that is, the ordinate axis of the correction plane coordinate system.

At S204, based on the scaling factors, the row mark of the ending row of pixels of the second partial region in the preset corrected image, the width of the second partial region, the column mark of the column of pixels where the symmetry axis, parallel to the ordinate axis, of the second partial region is located and the column mark of the ending column of pixels of the second partial region, the column mark of the ending column of pixels of the first partial region of the scanning region is determined.

The column mark of the ending column of pixels of the first partial region of the scanning region is calculated by the following formulas:

$$R1 = \min(x_0, B1+1)$$

$$B1 = \text{floor}(m + \text{Scale}[j_{Int}] \times (b-c)) + 1$$

wherein, R1 is the column mark of the ending column of pixels of the first partial region of the scanning region; $x_0$ is the column of pixels corresponding to the maximum abscissa of the image plane coordinate system; floor is the round-down function, that is, floor(k) is the maximum integer not greater than k; Scale is the scaling factors; $j_{Int}$ is the row mark of the ending row of pixels of the second partial region in the preset corrected image; B1 is the abscissa closest to a first right intersection pixel; B1 is an integer, and the first right intersection pixel is the intersection pixel with the maximum abscissa in the two intersection pixels where the ending row of pixels of the first partial region of the scanning region intersect the scanning region; m is the column mark of the column of pixels, in the scanning region, to which the symmetry axis, parallel to the ordinate axis, of the preset corrected image is mapped; b is the column mark of the ending column of pixels of the preset corrected image; c is the column mark of the column of pixels where the symmetrical axis, parallel to the ordinate axis, of the preset corrected image is located; and (b−c) is the half of width of the preset corrected image.

From this, the parameters of the first partial region of the scanning region may be determined as follows:
the row mark of the starting row of pixels: $T1 = JtoY[j_{Top}]$
the column mark of the starting column of pixels: $L1 = \max(1, A1)$
the column mark of the ending column of pixels: $R1 = \min(x_0, B1+1)$
the width: $W1 = R1 - L1 + 1$
the height: $H1 = JtoY[j_{Int}] + 1 - JtoY[j_{Top}] + 1$
wherein, W1 is the width of the first partial region of the scanning region, and H1 is the height of the first partial region of the scanning region.

After acquiring the pixel data obtained by scanning with the first partial region of the scanning region as the first pixel data, the first pixel data may be stored in the storage space. Exemplarily, the first pixel data is stored in the storage space starting from pIn based on the sequence from left to right in each row and from top to bottom between rows in the scanned image; of course, the first pixel data may also stored in the storage space starting from pIn based on the sequence from left to right in each row and from bottom to top between rows in the scanned image; both are reasonable.

At S102, the first pixel data is corrected by using a preset correction algorithm to obtain second pixel data, and the second pixel data is stored in the storage space.

After storing the first pixel data in the storage space, the first pixel data may be corrected by using the preset correction algorithm to obtain the second pixel data.

Figure 6:
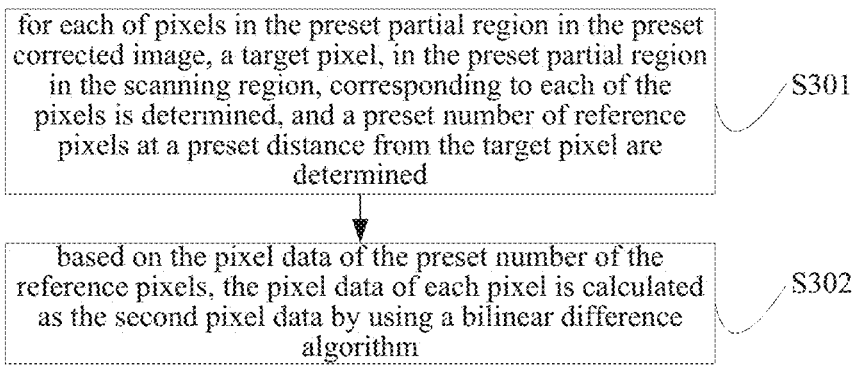
FIG. 6 is a schematic flowchart of determining the second pixel data provided by an embodiment of the present application.

Referring to FIG. 6, correcting the first pixel data by using a preset correction algorithm to obtain second pixel data may include the following steps.

At S301, for each of pixels in the second partial region, a target pixel, in the first partial region, corresponding to the pixel is determined, and a preset number of reference pixels at a preset distance from the target pixel are determined.

Both the target pixel and the reference pixels are pixels in the first partial region of the scanning region.

Wherein, the sequence of determining target pixels is the same as the sequence of storing the first pixel data in the storage space. Exemplarily, the sequence may be based on the sequence from left to right in each row and from top to bottom between rows in the second partial region, or may be based on the sequence from left to right in each row and from top to bottom between rows in the second partial region; both are reasonable.

Referring to FIG. 7, the preset number is 4, it is assumed that the pixel center of any pixel in the second partial region is P with the coordinate of $(p, j_p)$; the pixel center P is mapped from the correction plane coordinate system to P' in the image plane coordinate system, that is, the pixel center, of the target pixel, corresponding to the pixel center P of the pixel is P'. Four pixels, in the previous row of pixels and the next row of pixels, that are closest to the pixel center P' are determined; wherein, the pixel centers of the determined four pixels are marked with P1, P2, P3 and P4 respectively, and the coordinates of the determined four pixels are $(p_1, t)$, $(p_2, t)$, $(p_1, t+1)$ and $(p_2, t+1)$ respectively.

At S302, the pixel data of the pixel in the second partial region is calculated as the second pixel data by processing the pixel data of the preset number of the reference pixels using a bilinear difference algorithm.

After the target pixel and the reference pixels are determined, the pixel data of each pixel may be calculated as the second pixel data, by using the bilinear difference algorithm based on the pixel data of the preset number of the reference pixels.

The preset number is 4, and the formulas of the bilinear difference algorithm are as follows:

$$v = dy_p \times (dx_p \times v_1 + (1-dx_p) \times v_2) + (1-dy_p) \times (dx_p \times v_3 + (1-dx_p) \times v_4)$$

$$v = (dx_p \times (v_1+v_3) + (1-dx_p) \times (v_2+v_4))/2$$

$$dx_p = (m-p') - \text{floor}(m-p')$$

$$dy_p = DY[j_p]$$

$$(m-p') = \text{Scale}[j_p] \times (c-p)$$

wherein, v is the pixel value of any pixel in the second partial region of the preset corrected image; p is the column mark of the column where the pixel is located; $j_p$ is the row mark of the row where the pixel is located; $dy_p$ is the distance between the row of pixels, in the image plane coordinate system, to which the row of pixels where the pixel is located are mapped and the next row of pixels; $v_1$ is the pixel value of P1; $v_2$ is the pixel value of P2; $v_3$ is the pixel value of P3; $v_4$ is the pixel value of P4; $dx_p$ is the distance from the target pixel to the center line of the image plane coordinate system; m is the column mark of the column of pixels, in the scanning region, to which the symmetry axis, parallel to the ordinate axis, of the preset corrected image is mapped; c is the column mark of the column of pixels where the symmetry axis, parallel to the ordinate axis, of the preset corrected image is located; p' is the column mark of the column where the target pixel is located, DY is the distance correspondences; and Scale is the scaling factors.

A piece of pixel data of the second partial region is calculated each time, the piece of pixel data is regarded as a piece of second pixel data and is stored in the storage space. Exemplarily, each time a piece of second pixel data is calculated, the piece of second pixel data is stored in the memory starting from pOut, wherein, the pixel data includes a pixel value and a pixel location.

At S103, it is determined whether the remaining space of the storage space meets a preset condition, and if the remaining space of the storage space meets the preset condition, S104 is performed.

S103 can be understood as that: it is determined whether the remaining space of the storage space is small; if the remaining space of the storage space is small or is not sufficient to accommodate the pixel data to be stored, it means that the preset condition is met. In one case, S103 is an optional step, and S104 may be directly performed. S103 will be described in detail below.

After the second pixel data is stored in the storage space, the first "acquiring the image-storing the image-correcting the image-storing the image" is completed. At this time, there is still the remaining space in the storage space. In order to reduce the occurrence of image storage failures caused by insufficient storage space, it can be determined whether the remaining space of the storage space meets the preset condition, and the subsequent steps are performed based on the determination result.

There are many ways to determine whether the remaining space of the storage space meets the preset condition, including but not limited to the following ways:

The first way: it is determined whether the remaining space of the storage space meets the preset condition through estimation.

Referring to FIG. 8, S103 may include:

S1031: the first space occupied by storing the third pixel data obtained by scanning with the remaining region is estimated, and the second space occupied by storing the fourth pixel data obtained after the third pixel data is corrected by the preset correction algorithm is estimated; wherein, the scanning mode of the remaining region is the preset first scanning mode.

In order to determine whether the remaining space is sufficient to accommodate the pixel data: for the corrected image of the remaining region, the corrected image is the image scanned by the remaining region and the image obtained by correcting the image scanned by the remaining region when the preset first scanning mode is used; the first space occupied by storing the third pixel data obtained by scanning with the remaining region is estimated, and the second space occupied by storing the fourth pixel data obtained after the third pixel data is corrected by the preset correction algorithm is estimated.

Wherein, the process of determining the remaining region may include:

determining the remaining region, based on preset correspondences between rows of pixels of the preset corrected image and rows of pixels of the image to be corrected, the preset corrected image and the second partial region in the preset corrected image;

wherein, the preset correspondences include: row mark correspondences between the rows of pixels of the preset corrected image and the rows of pixels of the image to be corrected, and scaling factors between the rows of pixels of the preset corrected image and the rows of pixels of the image to be corrected.

It should be noted that since the preset corrected image is in the correction plane coordinate system, and the scanning region is in the image plane coordinate system, the row mark correspondences between the rows of pixels of the corrected image and the rows of pixels of the image to be corrected are the row mark correspondences between the rows of pixels of the image plane coordinate system and the rows of pixels of the correction plane coordinate system. The scaling factors are the scaling correspondences between the rows of pixels of the image plane coordinate system and the rows of pixels of the correction plane coordinate system.

Since there are correspondences between the rows of pixels of the corrected image and the rows of pixels of the image to be corrected, the remaining region may be determined, based on the correspondences between the rows of pixels of the corrected image and the rows of pixels of the image to be corrected, the preset corrected image, and the second partial region in the preset corrected image.

Figure 9:
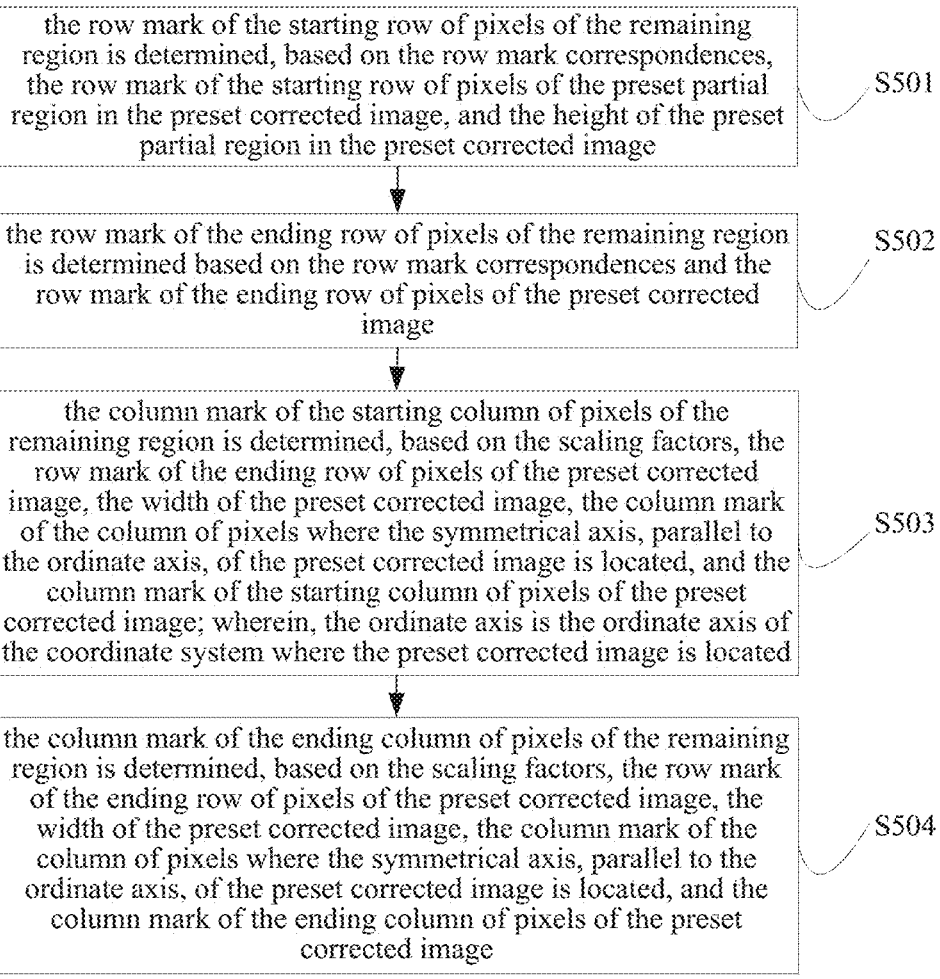
FIG. 9 is a schematic flowchart of determining the remaining region provided by an embodiment of the present application.

In an implementation, referring to FIG. 9, determining the remaining region, based on preset correspondences between rows of pixels of the corrected image and rows of pixels of the image to be corrected, the preset corrected image and the second partial region in the preset corrected image may include the following steps.

At S501, the row mark of the starting row of pixels of the remaining region is determined, based on the row mark correspondences, the row mark of the starting row of pixels of the second partial region in the preset corrected image, and the height of the second partial region.

In order to determine the remaining region, it is necessary to determine the starting row, the ending row, the starting column and the ending column of the remaining region. Of course, it is also possible to determine the starting row, the height, the starting column and the width of the remaining region. The both are possible. There may be many ways to determine the remaining region. Determining the remaining region by determining the starting row, the ending row, the starting column and the ending column of the remaining region will be described below.

Since the correspondence between the row mark of the j-th row of pixels in the correction plane coordinate system and the row mark of the y-th row of pixels in the image plane coordinate system is stored in an array JToY, the row mark of the starting row of pixels of the remaining region may be determined by the following formulas:

$$T2 = JtoY[j_{Top} + h1]$$

wherein, T2 is the row mark of the starting row of pixels of the remaining region, JtoY is the row mark correspondences, $j_{Top}$ is the row mark of the starting row of pixels of the second partial region in the preset corrected image, and h1 is the height of the second partial region.

At S502, the row mark of the ending row of pixels of the remaining region is determined based on the row mark correspondences and the row mark of the ending row of pixels of the preset corrected image.

Similarly, the row mark of the ending row of pixels of the remaining region is determined by the following formula:

$$T_{Bot} = JtoY[j_{Bot}] + 1$$

wherein, $T_{Bot}$ is the row mark of the ending row of pixels of the remaining region, JtoY is the row mark correspondences, and $j_{Bot}$ is the row mark of the ending row of pixels of the preset corrected image.

At S503, the column mark of the starting column of pixels of the remaining region is determined, based on the scaling factors, the row mark of the ending row of pixels of the preset corrected image, the width of the preset corrected image, the column mark of the column of pixels where the symmetrical axis, parallel to the ordinate axis, of the preset corrected image is located, and the column mark of the starting column of pixels of the preset corrected image; wherein, the ordinate axis is the ordinate axis of the coordinate system where the preset corrected image is located.

The column mark of the starting column of pixels of the remaining region is calculated by the following formulas:

$$L2 = \max(1, A2)$$

$$A2 = \text{floor}(m - \text{Scale}[j_{Bot}] * (c-a))$$

wherein, L2 is the column mark of the starting column of pixels of the remaining region; floor is the round-down function, that is, floor(k) is the maximum integer not greater than k; Scale is the scaling factors; $j_{Bot}$ is the row mark of the ending row of pixels of the preset corrected image; A2 is the abscissa closest to a second left intersection pixel; A2 is an integer, and the second left intersection pixel is the intersection pixel with the minimum abscissa in the two intersection pixels where the ending row of pixels of the remaining region intersect the scanning region; m is the column mark of the column of pixels, in the scanning region, to which the symmetry axis, parallel to the ordinate axis, of the preset corrected image is mapped; c is the column mark of the column of pixels where the symmetrical axis, parallel to the ordinate axis, of the preset corrected image is located; a is the column mark of the starting column of pixels of the preset corrected image; and (c−a) is the half of width of the preset corrected image.

Wherein, the ordinate axis is the ordinate axis of the coordinate system where the preset corrected image is located, that is, the ordinate axis of the correction plane coordinate system.

At S504, the column mark of the ending column of pixels of the remaining region is determined, based on the scaling factors, the row mark of the ending row of pixels of the preset corrected image, the width of the preset corrected image, the column mark of the column of pixels where the symmetrical axis, parallel to the ordinate axis, of the preset corrected image is located, and the column mark of the ending column of pixels of the preset corrected image.

The column mark of the ending column of pixels of the remaining region is calculated by the following formulas:

$$R2 = \min(x_0, B2+1)$$

$$B2 = \text{floor}(m + \text{Scale}[j_{Bot}] * (b-c)) + 1$$

wherein, R2 is the column mark of the ending column of pixels of the remaining region; $x_0$ is the column of pixels corresponding to the maximum abscissa of the image plane coordinate system; floor is the round-down function, that is, floor(k) is the maximum integer not greater than k; Scale is the scaling factors; $j_{Bot}$ is the row mark of the ending row of pixels of the preset corrected image; B2 is the abscissa closest to a second right intersection pixel; B2 is an integer, and the second right intersection pixel is the intersection pixel with the maximum abscissa in the two intersection pixels where the ending row of pixels of the remaining region intersect the scanning region; m is the column mark of the column of pixels, in the scanning region, to which the symmetry axis, parallel to the ordinate axis, of the preset corrected image is mapped; b is the column mark of the ending column of pixels of the preset corrected image; c is the column mark of the column of pixels where the symmetrical axis, parallel to the ordinate axis, of the preset corrected image is located; and (b−c) is the half of width of the preset corrected image.

Therefore, the parameters of the remaining region may be determined as follows:

the row mark of the starting row of pixels: $T2=\lfloor j_{Top}+h1 \rfloor$ the column mark of the starting column of pixels: $L2=\max(1,A2)$ the column mark of the ending column of pixels: $R2=\min(x_0,B2+1)$ the width: $W2=R2-L2+1$ the height: $H2=JtoY[j_{Bot}]+1-JtoY[j_{Int}+1]+1$ wherein, W2 is the width of the remaining region, and H2 is the height of the remaining region.

After acquiring the pixel data obtained by scanning with the remaining region of the scanning region as the third pixel data, the third pixel data may be stored in the storage space. Exemplarily, the third pixel data is stored in the storage space starting from pIn based on the sequence from left to right in each row and from top to bottom between rows in the scanned image; of course, the third pixel data may also stored in the storage space starting from pIn based on the sequence from left to right in each row and from bottom to top between rows in the scanned image; both are reasonable. At this time, $pIn=pOut+ImgBytes-floor((W2+1)/2)\times H2$.

After the remaining region is determined, since the preset first scanning mode is known, and the preset correction algorithm is also known, the first space and the second space may be estimated.

Exemplarily, the preset first scanning mode may be a row by row scanning mode.

At S1032, it is determined whether the remaining space of the storage space is less than the sum of the first space and the second space, and if the remaining space of the storage space is less than the sum of the first space and the second space, it is determined that the remaining space of the storage space meets the preset condition.

After estimating the first space and the second space, it is determined whether the remaining space of the storage space is less than the sum of the first space and the second space; and if the remaining space of the storage space is less than the sum of the first space and the second space, it means that the remaining space is not sufficient to accommodate the third pixel data and the fourth pixel data obtained after the third pixel data is corrected. At this time, it is determined that the remaining space of the storage space meets the preset condition.

The second way:

S103 may include that:

it is determined whether the row mark of the starting row of pixels of the second partial region in the preset corrected image is greater than the preset number of rows, and if the row mark of the starting row of pixels of the second partial region in the preset corrected image is greater than the preset number of rows, it is determined that the remaining space of the storage space meets the preset condition.

For example, the preset number of rows may be determined based on the widths of pixel rows of the image to be corrected. For example, the preset number of rows may be determined by the following formulas:

the following steps are performed cyclically for $i=1, 2, \ldots, j_0-h+1$:

$j_{Top}=i$ $j_{Bot}=j_{Top}+h-1$ $H2=JtoY[j_{Bot}]+1-JtoY[j_{Int}+1]+1$ if $\text{Width}(j_{Bot}) \times H2 \leq \text{ImgBytes}-\text{GapBytes}-w \times h1$, $j_1=i$, that is, returning to perform the above steps; otherwise: exiting the circulation; wherein, the value of $j_{Int}$ when exiting the circulation is the preset number of rows.

Wherein, $j_0$ is the row mark of the pixels corresponding to the maximum ordinate of the correction plane coordinate system; i is the column marks of pixels of the preset corrected image; h is the height of the preset corrected image; JtoY is the row mark correspondences; w is the width of the second partial region; $\text{Width}(j_{Bot})$ is the width of the row of pixels, in the image plane coordinate system, to which the ending row of pixels of the preset corrected image are mapped (the pixel region in the image plane coordinate system is trapezoidal, so the widths of various pixel rows are different); $j_{Top}$ is the row mark of the starting row of pixels of the second partial region; $j_{Bot}$ is the row mark of the ending row of pixels of the preset corrected image; H2 is the height of the remaining region; $j_{Int}$ is the row mark of the ending row of pixels of the second partial region; ImgBytes−GapBytes is the size of the storage space for storing the corrected image and the image to be corrected; and h1 is the height of the second partial region.

If it is determined that the row mark of the starting row of pixels of the second partial region in the preset corrected image is greater than the preset number of rows, it means that the row mark of the starting row of pixels of the second partial region is larger, and then the first partial region, in the image to be corrected in the image plane coordinate system, to which the second partial region is mapped is larger, which further makes the remaining region larger.

Since the remaining region is larger, the pixel data obtained by scanning with the remaining region in the first scanning mode is larger, such that further the space occupied by the pixel data obtained by correcting the pixel data is larger, resulting in the remaining space not sufficient to accommodate the pixel data obtained by scanning and the pixel data obtained by correcting the pixel data obtained by scanning, that is, the remaining space is not sufficient to accommodate the third pixel data and the fourth pixel data obtained after the third pixel data is corrected; at this time, it is determined that the remaining space of the storage space meets the preset condition.

At S104, the pixel data obtained by scanning with the remaining region of the scanning region is acquired as the third pixel data, and the third pixel data is stored in the storage space; wherein, the remaining region is the region, other than the first partial region, in the scanning region; the scanning mode of the remaining region is a preset second scanning mode, and for the remaining region, the number of pixels obtained by scanning in the preset second scanning mode is less than the number of pixels obtained by scanning in the preset first scanning mode.

In the embodiment of the present invention, there are two scanning modes; in order to distinguish the description, the scanning mode with a smaller number of the pixels obtained by scanning is called as the second scanning mode, and the scanning mode with a larger number of the pixels obtained by scanning is called as the first scanning mode. Exemplarily, the preset first scanning mode is a row-by-row and column-by-column scanning mode, and the preset second scanning mode is a row-by-row and at intervals of one column scanning mode.

Since the remaining space is not sufficient to accommodate the image scanned by the remaining region and the corrected image for the remaining region when using the preset first scanning mode, the corrected image being an image obtained by correcting the image scanned by the remaining region when using the preset first scanning mode, at this time, in order to enable the remaining space to accommodate the image scanned by the remaining region and the corrected image for the remaining region when using the preset first scanning mode, the pixel data obtained by scanning with the remaining region of the scanning region needs to be acquired as the third pixel data, wherein, the remaining region is the region, other than the first partial region, in the scanning region; the scanning mode of the remaining region is a preset second scanning mode, and for the remaining region, the number of pixels obtained by scanning in the preset second scanning mode is less than the number of pixels obtained by scanning in the preset first scanning mode. After acquiring the third pixel data, the third pixel data may be stored in the storage space.

At S105, the third pixel data is corrected by using the preset correction algorithm to obtain fourth pixel data, and the fourth pixel data is stored in the storage space.

After storing the third pixel data, the third pixel data may be corrected by using the preset correction algorithm to obtain the fourth pixel data.

The manner in which the third pixel data is corrected by using the preset correction algorithm to obtain the fourth pixel data is similar to the manner in which the second pixel data is obtained in S102, which refers to S102 and the method shown in FIG. 6, and will not be repeated here.

A piece of the fourth pixel data is calculated each time, it is stored in the storage space. Exemplarily, a piece of the fourth pixel data is calculated each time, it is stored in the memory beginning from pOut. At this time, pOut is shifted to the right by w×h1 bits relative to the starting address of the storage space; wherein, w is the width of the second partial region in the preset corrected image, and h1 is the height of the second partial region.

As a result, the second "acquiring the image-storing the image-correcting the image-storing the image" is completed, and the images acquired twice and the twice corrected images are stored in the storage space. Finally, the image scanned by the scanning region with pOut as the head address and the corrected image obtained after correcting the image scanned by the scanning region are obtained.

In the embodiment of this application, pixel data obtained by scanning with a first partial region of a scanning region is acquired as first pixel data, and the first pixel data is stored in a storage space; wherein, a scanning mode of the first partial region is a preset first scanning mode; the first pixel data is corrected by using a preset correction algorithm to obtain second pixel data, and the second pixel data is stored in the storage space; it is determined whether the remaining space of the storage space meets a preset condition, and if the remaining space of the storage space meets the preset condition, the pixel data obtained by scanning with the remaining region of the scanning region is acquired as the third pixel data, and the third pixel data is stored in the storage space; wherein, the remaining region is the region, other than the first partial region, in the scanning region; the scanning mode of the remaining region is a preset second scanning mode, and for the remaining region, the number of pixels obtained by scanning in the preset second scanning mode is less than the number of pixels obtained by scanning in the preset first scanning mode; the third pixel data is corrected by using a preset correction algorithm to obtain fourth pixel data, and the fourth pixel data is stored in the storage space.

In this application, the first partial region uses the first scanning mode, and the remaining region uses the second scanning mode, and the number of pixels obtained by scanning in the second scanning mode is less than the number of pixels obtained by scanning in the first scanning mode; in this way, in the first aspect, compared to all scanning regions using the first scanning mode, the size of the scanned image is reduced, that is, the size of the image before correction, and thus the occurrence of image storage failure caused by insufficient storage space, and the success rate of image storage is improved; in the second aspect, the content scanned by the first partial region is of higher importance, and the first partial region scans in the first scanning mode with a larger number of pixels, which can ensure higher image quality. It can be seen that applying the embodiment of the present application, on the premise of increasing the success rate of image storage, higher image quality can be guaranteed.

Figure 10:
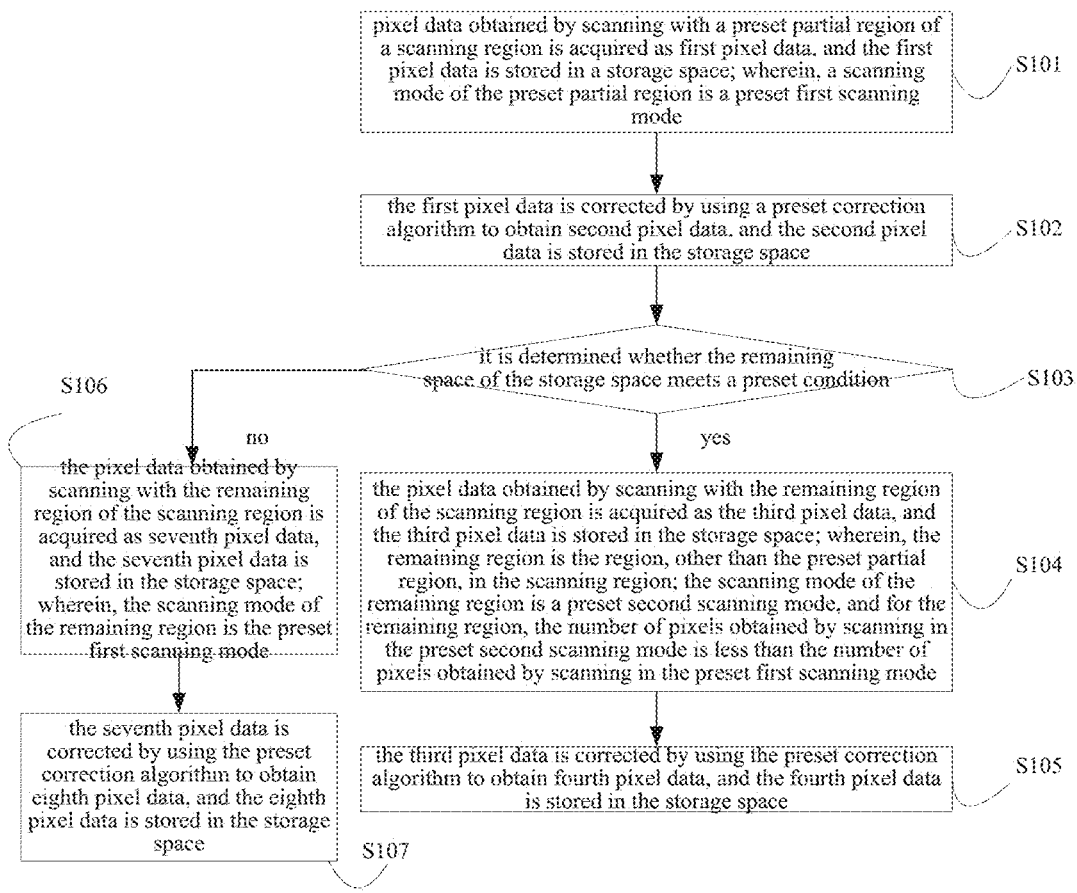
FIG. 10 is a second schematic flowchart of an image storage method provided by an embodiment of the present application.

Based on the method shown in FIG. 4, when the remaining space of the storage space does not meet the preset condition, referring to FIG. 10, the above method may further include:

At S106, the pixel data obtained by scanning with the remaining region of the scanning region is acquired as seventh pixel data, and the seventh pixel data is stored in the storage space; wherein, the scanning mode of the remaining region is the preset first scanning mode.

When it is determined that the remaining space of the storage space does not meet the preset condition, it means that the remaining space is sufficient to accommodate the image scanned by the remaining region and the corrected image for the remaining region when the preset first scanning mode is used; the corrected image is an image obtained by correcting the image scanned by the remaining region when the preset first scanning mode is used; at this time, the pixel data scanned by the remaining region of the scanning region may be obtained as the seventh pixel data; wherein, the scanning mode of the remaining region is the preset first scanning mode.

Acquiring the pixel data obtained by scanning with the remaining region of the scanning region as the seventh pixel data is similar to the way of acquiring the pixel data obtained by scanning with the first partial region of the scanning region as the first pixel data in S101, which may refer to S101, and will not be repeated here.

After the seventh pixel data is acquired, the seventh pixel data may be stored in the storage space. Exemplarily, the seventh pixel data is stored in the storage space starting from pIn based on the sequence from left to right in each row and from top to bottom between rows in the scanned image; of course, the seventh pixel data may also stored in the storage space starting from pIn based on the sequence from left to right in each row and from bottom to top between rows in the scanned image; both are reasonable. At this time, pIn=pOut+ImgBytes−W2×H2, wherein W2 is the width of the remaining region, H2 is the height of the remaining region, pIn is configured for marking the head address of the storage location of the image scanned by the image sensor in the storage space, POut is configured for marking the head address of the storage location of the corrected image obtained after the object image is corrected in the storage space, and ImgBytes is the size of the storage space for storing the image.

At S107, the seventh pixel data is corrected by using the preset correction algorithm to obtain eighth pixel data, and the eighth pixel data is stored in the storage space.

After storing the seventh pixel data, the seventh pixel data may be corrected by using the preset correction algorithm to obtain the eighth pixel data.

Correcting the seventh pixel data by using a preset correction algorithm to obtain eighth pixel data may include the following steps.

For each of pixels in the remaining region other than the first partial region in the preset corrected image, the first pixel, the first partial region, corresponding to the pixel is determined, and a preset number of second pixels at a preset distance from the first pixel are determined;

the pixel data of the pixel in the remaining region is calculated as the eighth pixel data by processing the pixel data of the preset number of the second pixels using a bilinear difference algorithm.

For each of pixels in the remaining region other than the first partial region in the preset corrected image, the first pixel corresponding to each of pixels in the remaining region of the scanning region is determined. In order to calculate the eighth pixel data, it is also necessary to determine a preset number of second pixels at a preset distance from the first pixel.

Wherein, the sequence of determining first pixels is the same as the sequence of storing the seventh pixel data in the storage space. Exemplarily, the sequence may be the sequence from left to right in each row and from top to bottom between rows in the remaining region other than the first partial region in the preset corrected image, or may be the sequence from left to right in each row and from bottom to top between rows in the remaining region other than the first partial region in the preset corrected image; both are reasonable.

The preset number is 4, it is assumed that the pixel center of any pixel in the remaining region other than the first partial region in the preset corrected image is Q with the coordinate of $(q, j_q)$; the pixel center Q is mapped from the correction plane coordinate system to Q' in the image plane coordinate system, that is, the pixel center, of the first pixel, corresponding to the pixel center Q of the pixel is Q'. Four pixels, in the previous row of pixels and the next row of pixels, that are closest to the pixel center Q' are determined; wherein, the pixel centers of the determined four pixels are marked with Q1, Q2, Q3 and Q4 respectively, and the coordinates of the determined four pixels are $(q_1, s)$, $(q_2, s)$, $(q_1, s+1)$ and $(q_2, s+1)$ respectively.

After the first pixel and the second pixels are determined, the pixel data of each pixel may be calculated as the eighth pixel data, by using the bilinear difference algorithm based on the pixel data of the preset number of the second pixels.

The preset number is 4, and the formulas of the bilinear difference algorithm are as follows:

$$u = dy_q \times (dx_q \times u_1 + (1 - dx_q) \times u_2) + (1 - dy_q) \times (dx_q \times u_3 + (1 - dx_q) \times u_4)$$

$$u = (dx_q \times (u_1 + u_3) + (1 - dx_q) \times (u_2 + u_4))/2$$

$$dx_q = \text{ceiling}\left(\frac{q' - L2}{2}\right) - \frac{q' - L2}{2}$$

$$(q' - L2) = \text{Scale}[j_q] \times \left(q - c + \frac{w}{2}\right)$$

$$dy_q = DY[j_q]$$

$$(m - q') = \text{Scale}[j_q] \times (c - q)$$

wherein, u is the pixel value of any pixel in the remaining region other than the first partial region in the preset corrected image; q is the column mark of the column where the pixel is located; $j_q$ is the row mark of the row where the pixel is located; $dy_q$ is the distance between the row of pixels, in the image plane coordinate system, to which the row of pixels where the pixel is located are mapped and the next row of pixels; $u_1$ is the pixel value of Q1; $u_2$ is the pixel value of Q2; $u_3$ is the pixel value of Q3; $u_4$ is the pixel value of Q4; $dx_q$ is the distance from the first pixel to the center line of the image plane coordinate system; m is the column mark of the column of pixels, in the scanning region, to which the symmetry axis, parallel to the ordinate axis, of the preset corrected image is mapped; c is the column mark of the column of pixels where the symmetry axis, parallel to the ordinate axis, of the preset corrected image is located; q' is the column mark of the column where the first pixel is located, DY is the distance correspondences; Scale is the scaling factors; L2 is the column mark of the starting column of pixels of the remaining region; and ceiling is a round-up function, that is, ceiling(k) is the maximum integer not less than k.

A piece of pixel data of the remaining region other than the first partial region in the preset corrected image is calculated each time, the piece of pixel data is regarded as a piece of eighth pixel data and is stored in the storage space. Exemplarily, a piece of eighth pixel data is calculated each time, it is stored in the memory beginning from pOut. At this time, pOut is shifted to the right by w×h1 bits relative to the starting address of the storage space; wherein, w is the width of the second partial region in the preset corrected image, and h1 is the height of the second partial region in the preset corrected image.

The starting address of the storage space is shifted to the right by w×h1 bits, thus, when it is determined that the remaining space of the storage space does not meet the preset condition, the pixel data obtained by scanning with the remaining region of the scanning region is acquired as the seventh pixel data, and the seventh pixel data is stored in the storage space, wherein, the scanning mode of the remaining region is the preset first scanning mode; the seventh pixel data is corrected to obtain the eighth pixel data, and the eighth pixel data is stored in the storage space; for the remaining region, compared with the preset second scanning mode, the number of pixels obtained by scanning in the preset first scanning mode is larger, therefore, the pixel quality of the scanned image and the corrected image is improved.

Corresponding to the above method embodiment, an embodiment of the present application further provides an image storage apparatus. The apparatus may include:

an image capture module configured for scanning and capturing an image; and a processor configured for acquiring pixel data obtained by scanning with a first partial region of a scanning region as first pixel data, and storing the first pixel data in a storage space; wherein, a scanning mode of the first partial region is a preset first scanning mode; correcting the first pixel data by using a preset correction algorithm to obtain second pixel data, and storing the second pixel data in the storage space; acquiring the pixel data obtained by scanning with the remaining region of the scanning region as third pixel data, and storing the third pixel data in the storage space; wherein, the remaining region is a region, other than the first partial region, in the scanning region; the scanning mode of the remaining region is a preset second scanning mode, and for the remaining region, the number of pixels obtained by scanning in the preset second scanning mode is less than the number of pixels obtained by scanning by using the preset first scanning mode; correcting the third pixel data by using the preset correction algorithm to obtain fourth pixel data, and storing the fourth pixel data in the storage space.

The processor can be configured for performing the above any image storage method.

In the embodiment of this application, pixel data obtained by scanning with a first partial region of a scanning region is acquired as first pixel data, and the first pixel data is stored in a storage space; wherein, a scanning mode of the first partial region is a preset first scanning mode; the first pixel data is corrected by using a preset correction algorithm to obtain second pixel data, and the second pixel data is stored in the storage space; it is determined whether the remaining space of the storage space meets a preset condition, and if the remaining space of the storage space meets the preset condition, the pixel data obtained by scanning with the remaining region of the scanning region is acquired as the third pixel data, and the third pixel data is stored in the storage space; wherein, the remaining region is the region, other than the first partial region, in the scanning region; the scanning mode of the remaining region is a preset second scanning mode, and for the remaining region, the number of pixels obtained by scanning in the preset second scanning mode is less than the number of pixels obtained by scanning in the preset first scanning mode; the third pixel data is corrected by using a preset correction algorithm to obtain fourth pixel data, and the fourth pixel data is stored in the storage space. In the present application, after storing the first pixel data obtained by scanning with the first partial region and the second pixel data obtained after correcting the first pixel data, it is determined whether the remaining storage space meets the preset condition; and if the remaining storage space meets the preset condition, the third pixel data obtained by scanning with the remaining region of the scanning region is acquired, and the third pixel data and the fourth pixel data obtained after correcting the third pixel data are stored. Since the scanning mode of the remaining region is the preset second scanning mode, and for the remaining region, the number of pixels obtained by scanning in the preset second scanning mode is less than the number of pixels obtained by scanning in the preset first scanning mode, compared with the existing method, applying the solution of the embodiment of the present application, the size of the scanned image can be reduced, that is, the size of the image before correction, and thus the occurrence of image storage failure caused by insufficient storage space is reduced, and the success rate of image storage is improved.

Figure 11:
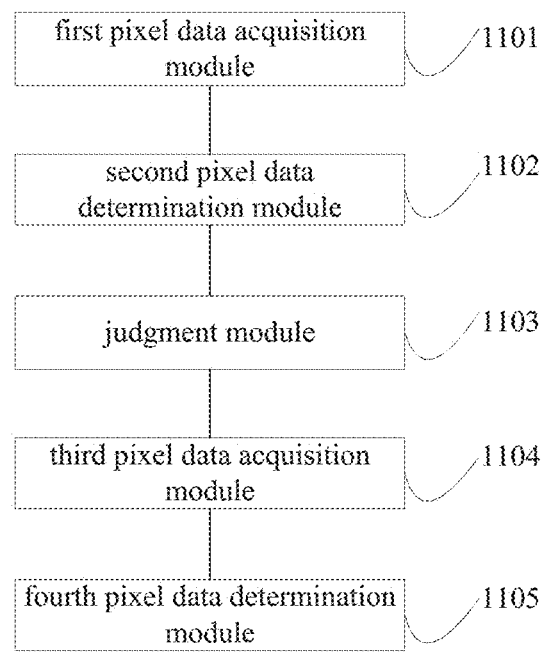
FIG. 11 is a schematic structural diagram of an image storage apparatus provided by an embodiment of the present application.

In an implementation of the embodiment of the present application, as shown in FIG. 11, the processor may include:

a first pixel data acquisition module 1101, configured for acquiring pixel data obtained by scanning by a first partial region of a scanning region as first pixel data, and storing the first pixel data in a storage space; wherein, a scanning mode of the first partial region is a preset first scanning mode;

a second pixel data determination module 1102, configured for correcting the first pixel data by using a preset correction algorithm to obtain second pixel data, and storing the second pixel data in the storage space;

a judgment module 1103 (optional), configured for determining whether the remaining space of the storage space meets a preset condition, and if the remaining space of the storage space meets the preset condition, triggering a third pixel data acquisition module 1104;

the third pixel data acquisition module 1104, configured for acquiring the pixel data obtained by scanning with the remaining region of the scanning region as the third pixel data, and storing the third pixel data in the storage space; wherein, the remaining region is the region, other than the first partial region, in the scanning region; the scanning mode of the remaining region is a preset second scanning mode, and for the remaining region, the number of pixels obtained by scanning in the preset second scanning mode is less than the number of pixels obtained by scanning in the preset first scanning mode; and a fourth pixel data determination module 1105, configured for correcting the third pixel data by using the preset correction algorithm to obtain fourth pixel data, and storing the fourth pixel data in the storage space.

In an implementation of the embodiment of the present application, the apparatus may further include a first determination module; the first determination module is configured for determining the first partial region in the scanning region, and the first determination module is specifically configured for:

determining the first partial region of the scanning region, based on preset correspondences between rows of pixels of the corrected image and rows of pixels of the image to be corrected and the second partial region in the preset corrected image;

wherein, the preset correspondences between the rows of pixels of the corrected image and the rows of pixels of the image to be corrected include: row mark correspondences between the rows of pixels of the corrected image and the rows of pixels of the image to be corrected, and scaling factors between the rows of pixels of the preset corrected image and the rows of pixels of the image to be corrected.

In an implementation of the embodiment of the present application, the row mark correspondences between the rows of pixels of the corrected image and the rows of pixels of the image to be corrected are expressed by a preset formula, and the preset formula may be:

if $y \le j' \langle y+1, j$ corresponds to $y$;

wherein, y is the row mark of the y-th row of pixels in the image to be corrected, j is the row mark of the j-th row of pixels in the corrected image, and j' is the row mark of the row of pixels, in the image to be corrected, to which the j-th row of pixels in the corrected image is mapped.

In an implementation of the embodiment of the present application, the first determination module may include:

a first row mark of starting row of pixels determination unit, configured for determining the row mark of the starting row of pixels of the first partial region of the scanning region based on the row mark correspondences and the row mark of the starting row of pixels of the second partial region in the preset corrected image;

a first row mark of ending row of pixels determination unit, configured for determining the row mark of the ending row of pixels of the first partial region of the scanning region based on the row mark correspondences and the row mark of the ending row of pixels of the second partial region in the preset corrected image;

a first column mark of starting column of pixels determination unit, configured for determining the column mark of the starting column of pixels of the first partial region of the scanning region, based on the scaling factors, the row mark of the ending row of pixels of the second partial region in the preset corrected image, the width of the second partial region in the preset corrected image, the column mark of the column of pixels where the symmetry axis, parallel to the ordinate axis, of the second partial region in the preset corrected image is located and the column mark of the starting column of pixels of the second partial region in the preset corrected image; wherein, the ordinate axis is the ordinate axis of the coordinate system where the preset corrected image is located;

a first column mark of ending column of pixels determination unit, configured for determining the column mark of the ending column of pixels of the first partial region of the scanning region, based on the scaling factors, the row mark of the ending row of pixels of the second partial region in the preset corrected image, the width of the second partial region in the preset corrected image, the column mark of the column of pixels where the symmetry axis, parallel to the ordinate axis, of the second partial region in the preset corrected image is located and the column mark of the ending column of pixels of the second partial region in the preset corrected image.

In an implementation of the embodiment of the present application, the second pixel data determination module may include:

a target pixel determination unit, configured for: for each of pixels in the second partial region in the preset corrected image, determining a target pixel, in the first partial region of the scanning region, corresponding to the pixel, and determining a preset number of reference pixels at a preset distance from the target pixel;

a second pixel data determination unit, configured for calculating the pixel data of each of pixels as the second pixel data, by using a bilinear difference algorithm based on the pixel data of the preset number of the reference pixels; wherein, the pixel data includes a pixel value and a pixel position.

In an implementation of the embodiment of the present application, the judgment module may include:

an estimation unit, configured for acquiring the pixel data obtained by scanning with the remaining region as third pixel data, estimating the first space occupied by storing the third pixel data, and estimating the second space occupied by storing the fourth pixel data obtained after the third pixel data is corrected by the preset correction algorithm; wherein, the scanning mode of the remaining region is the preset first scanning mode;

a space judgment unit, configured for determining whether the remaining space of the storage space is less than the sum of the first space and the second space, and if the remaining space of the storage space is less than the sum of the first space and the second space, determining that the remaining space of the storage space meets the preset condition.

In an implementation of the embodiment of the present application, the judgment module may be specifically configured for:

determining whether the row mark of the starting row of pixels of the second partial region in the preset corrected image is greater than the preset number of rows, and if the row mark of the starting row of pixels of the second partial region in the preset corrected image is greater than the preset number of rows, determining that the remaining space of the storage space meets the preset condition.

In an implementation of the embodiment of the present application, the apparatus may further include:

a seventh pixel data acquisition module, configured for: if the remaining space of the storage space does not meet the preset condition, acquiring the pixel data obtained by scanning with the remaining region of the scanning region as seventh pixel data, and storing the seventh pixel data in the storage space; wherein, the scanning mode of the remaining region is the preset first scanning mode;

an eighth pixel data determination module, configured for correcting the seventh pixel data by using the preset correction algorithm to obtain eighth pixel data, and storing the eighth pixel data in the storage space.

In an implementation of the embodiment of the present application, the apparatus may further include a second determination module; the second determination module is configured for determining the remaining region, and the second determination module may be specifically configured for:

determining the remaining region, based on preset correspondences between rows of pixels of the corrected image and rows of pixels of the image to be corrected, the preset corrected image and the second partial region in the preset corrected image;

wherein, the preset correspondences between the rows of pixels of the corrected image and the rows of pixels of the image to be corrected include: row mark correspondences between the rows of pixels of the corrected image and the rows of pixels of the image to be corrected, and scaling factors corresponding to the rows of pixels of the corrected image.

In an implementation of the embodiment of the present application, the second determination module may include:

a second row mark of starting row of pixels determination unit, configured for determining the row mark of the starting row of pixels of the remaining region, based on the row mark correspondences, the row mark of the starting row of pixels of the second partial region in the preset corrected image, and the height of the second partial region in the preset corrected image;

a second row mark of ending row of pixels determination unit, configured for determining the row mark of the ending row of pixels of the remaining region based on the row mark correspondences and the row mark of the ending row of pixels of the preset corrected image;

a second column mark of starting column of pixels determination unit, configured for determining the column mark of the starting column of pixels of the remaining region, based on the scaling factors, the row mark of the ending row of pixels of the preset corrected image, the width of the preset corrected image, the column mark of the column of pixels where the symmetrical axis, parallel to the ordinate axis, of the preset corrected image is located, and the column mark of the starting column of pixels of the preset corrected image; wherein, the ordinate axis is the ordinate axis of the coordinate system where the preset corrected image is located;

a second column mark of ending column of pixels determination unit, configured for determining the column mark of the ending column of pixels of the remaining region, based on the scaling factors, the row mark of the ending row of pixels of the preset corrected image, the width of the preset corrected image, the column mark of the column of pixels where the symmetrical axis, parallel to the ordinate axis, of the preset corrected image is located, and the column mark of the ending column of pixels of the preset corrected image.

Figure 12:
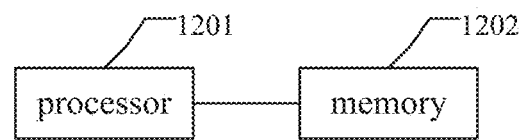
FIG. 12 is a schematic structural diagram of an electronic device provided by an embodiment of the present application.

An embodiment of the present application further provides an electronic device. As shown in FIG. 12, the electronic device includes: a processor 1201 and a memory 1202; wherein, the memory 1202 is configured for storing a computer program;

the processor 1201 is configured for, when executing the computer program stored in the memory 1202, implementing the steps of:

acquiring pixel data obtained by scanning with a first partial region of a scanning region as first pixel data, and storing the first pixel data in a storage space; wherein, a scanning mode of the first partial region is a preset first scanning mode;

correcting the first pixel data by using a preset correction algorithm to obtain second pixel data, and storing the second pixel data in the storage space;

determining whether the remaining space of the storage space meets a preset condition;

if the remaining space of the storage space meets the preset condition, acquiring the pixel data obtained by scanning with the remaining region of the scanning region as the third pixel data, and storing the third pixel data in the storage space; wherein, the remaining region is the region, other than the first partial region, in the scanning region; the scanning mode of the remaining region is a preset second scanning mode, and for the remaining region, the number of pixels obtained by scanning in the preset second scanning mode is less than the number of pixels obtained by scanning in the preset first scanning mode; and correcting the third pixel data by using the preset correction algorithm to obtain fourth pixel data, and storing the fourth pixel data in the storage space.

In the embodiment of this application, the electronic device: acquires pixel data obtained by scanning with a first partial region of a scanning region as first pixel data, and stores the first pixel data in a storage space; wherein, a scanning mode of the first partial region is a preset first scanning mode; corrects the first pixel data by using a preset correction algorithm to obtain second pixel data, and stores the second pixel data in the storage space; determines whether the remaining space of the storage space meets a preset condition, and if the remaining space of the storage space meets the preset condition, acquires the pixel data obtained by scanning with the remaining region of the scanning region as the third pixel data, and stores the third pixel data in the storage space; wherein, the remaining region is the region, other than the first partial region, in the scanning region; the scanning mode of the remaining region is a preset second scanning mode, and for the remaining region, the number of pixels obtained by scanning in the preset second scanning mode is less than the number of pixels obtained by scanning in the preset first scanning mode; corrects the third pixel data by using a preset correction algorithm to obtain fourth pixel data, and stores the fourth pixel data in the storage space. In the present application, after storing the first pixel data obtained by scanning with the first partial region and the second pixel data obtained after correcting the first pixel data, it is determined whether the remaining storage space meets the preset condition; and if the remaining storage space meets the preset condition, the third pixel data obtained by scanning with the remaining region of the scanning region is acquired, and the third pixel data and the fourth pixel data obtained after correcting the third pixel data are stored. Since the scanning mode of the remaining region is the preset second scanning mode, and for the remaining region, the number of pixels obtained by scanning in the preset second scanning mode is less than the number of pixels obtained by scanning in the preset first scanning mode, compared with the existing method, applying the solution of the embodiment of the present application, the size of the scanned image can be reduced, that is, the size of the image before correction, and thus the occurrence of image storage failure caused by insufficient storage space is reduced, and the success rate of image storage is improved.

The memory in electronic device may include a random access memory (RAM), or may include a non-volatile memory (NVM), for example at least one disk memory. Optionally, the memory may further be at least one storage apparatus located away from the above processor.

The above processor may be a general-purpose processor, such as a central processing unit (CPU), a network processor (NP), or the like; it may also be a digital signal processor (DSP), an application specific integrated circuit (ASIC), a field-programmable gate array (FPGA) or other programmable logic device, a discrete gate or transistor logic device, a discrete hardware component.

An embodiment of the present application further provides a computer readable storage medium. The computer readable storage medium stores a computer program. The computer program, when executed by a processor, causes the processor to implement the following steps:

acquiring pixel data obtained by scanning with a first partial region of a scanning region as first pixel data, and storing the first pixel data in a storage space; wherein, a scanning mode of the first partial region is a preset first scanning mode;

correcting the first pixel data by using a preset correction algorithm to obtain second pixel data, and storing the second pixel data in the storage space;

determining whether the remaining space of the storage space meets a preset condition;

if the remaining space of the storage space meets the preset condition, acquiring the pixel data obtained by scanning with the remaining region of the scanning region as the third pixel data, and storing the third pixel data in the storage space; wherein, the remaining region is the region, other than the first partial region, in the scanning region; the scanning mode of the remaining region is a preset second scanning mode, and for the remaining region, the number of pixels obtained by scanning in the preset second scanning mode is less than the number of pixels obtained by scanning in the preset first scanning mode; and correcting the third pixel data by using the preset correction algorithm to obtain fourth pixel data, and storing the fourth pixel data in the storage space.

In the embodiment of this application, the computer program, when executed by a processor, cause the processor to: acquire pixel data obtained by scanning with a first partial region of a scanning region as first pixel data, and store the first pixel data in a storage space; wherein, a scanning mode of the first partial region is a preset first scanning mode; correct the first pixel data by using a preset correction algorithm to obtain second pixel data, and store the second pixel data in the storage space; determine whether the remaining space of the storage space meets a preset condition, and if the remaining space of the storage space meets the preset condition, acquire the pixel data obtained by scanning with the remaining region of the scanning region as the third pixel data, and store the third pixel data in the storage space; wherein, the remaining region is the region, other than the first partial region, in the scanning region; the scanning mode of the remaining region is a preset second scanning mode, and for the remaining region, the number of pixels obtained by scanning in the preset second scanning mode is less than the number of pixels obtained by scanning in the preset first scanning mode; correct the third pixel data by using a preset correction algorithm to obtain fourth pixel data, and store the fourth pixel data in the storage space. In the present application, after storing the first pixel data obtained by scanning with the first partial region and the second pixel data obtained after correcting the first pixel data, it is determined whether the remaining storage space meets the preset condition; and if the remaining storage space meets the preset condition, the third pixel data obtained by scanning with the remaining region of the scanning region is acquired, and the third pixel data and the fourth pixel data obtained after correcting the third pixel data are stored. Since the scanning mode of the remaining region is the preset second scanning mode, and for the remaining region, the number of pixels obtained by scanning in the preset second scanning mode is less than the number of pixels obtained by scanning in the preset first scanning mode, compared with the existing method, applying the solution of the embodiment of the present application, the size of the scanned image can be reduced, that is, the size of the image before correction, and thus the occurrence of image storage failure caused by insufficient storage space is reduced, and the success rate of image storage is improved.

In an implementation of the embodiment of the present application, the process of determining the first partial region of the scanning region includes:

determining the first partial region of the scanning region, based on preset correspondences between rows of pixels of the corrected image and rows of pixels of the image to be corrected and the second partial region in the preset corrected image;

wherein, the preset correspondences between the rows of pixels of the corrected image and the rows of pixels of the image to be corrected include: row mark correspondences between the rows of pixels of the corrected image and the rows of pixels of the image to be corrected, and scaling factors corresponding to the rows of pixels of the corrected image.

In an implementation of the embodiment of the present application, the row mark correspondences between the rows of pixels of the corrected image and the rows of pixels of the image to be corrected are expressed by a preset formula, and the preset formula may be:

if $y \leq j'\langle y+1, j$ corresponds to $y$;

wherein, y is the row mark of the y-th row of pixels in the image to be corrected, j is the row mark of the j-th row of pixels in the corrected image, and j' is the row mark of the row of pixels, in the image to be corrected, to which the j-th row of pixels in the corrected image is mapped.

In an implementation of the embodiment of the present application, the step of determining the first partial region of the scanning region, based on the preset correspondences between rows of pixels of the preset corrected image and rows of pixels of the image to be corrected and the second partial region in the preset corrected image may include:

determining the row mark of the starting row of pixels of the first partial region of the scanning region based on the row mark correspondences and the row mark of the starting row of pixels of the second partial region in the preset corrected image;

determining the row mark of the ending row of pixels of the first partial region of the scanning region based on the row mark correspondences and the row mark of the ending row of pixels of the second partial region in the preset corrected image;

determining the column mark of the starting column of pixels of the first partial region of the scanning region, based on the scaling factors, the row mark of the ending row of pixels of the second partial region in the preset corrected image, the width of the second partial region in the preset corrected image, the column mark of the column of pixels where the symmetry axis, parallel to the ordinate axis, of the second partial region in the preset corrected image is located and the column mark of the starting column of pixels of the second partial region in the preset corrected image; wherein, the ordinate axis is the ordinate axis of the coordinate system where the preset corrected image is located;

determining the column mark of the ending column of pixels of the first partial region of the scanning region, based on the scaling factors, the row mark of the ending row of pixels of the second partial region in the preset corrected image, the width of the second partial region in the preset corrected image, the column mark of the column of pixels where the symmetry axis, parallel to the ordinate axis, of the second partial region in the preset corrected image is located and the column mark of the ending column of pixels of the second partial region in the preset corrected image.

In an implementation of the embodiment of the present application, the step of correcting the first pixel data by using a preset correction algorithm to obtain second pixel data may include:

for each of pixels in the second partial region in the preset corrected image, determining a target pixel, in the first partial region of the scanning region, corresponding to the pixel, and determining a preset number of reference pixels at a preset distance from the target pixel;

calculating the pixel data of each of pixels as the second pixel data, by using a bilinear difference algorithm based on the pixel data of the preset number of the reference pixels; wherein, the pixel data includes a pixel value and a pixel position.

In an implementation of the embodiment of the present application, the step of determining whether the remaining space of the storage space meets a preset condition may include:

acquiring the pixel data obtained by scanning with the remaining region as third pixel data, estimating the first space occupied by storing the third pixel data, and estimating the second space occupied by storing the fourth pixel data obtained after the third pixel data is corrected by the preset correction algorithm; wherein, the scanning mode of the remaining region is the preset first scanning mode;

determining whether the remaining space of the storage space is less than the sum of the first space and the second space;

if the remaining space of the storage space is less than the sum of the first space and the second space, determining that the remaining space of the storage space meets the preset condition.

In an implementation of the embodiment of the present application, the step of determining whether the remaining space of the storage space meets a preset condition may include:

determining whether the row mark of the starting row of pixels of the second partial region in the preset corrected image is greater than the preset number of rows;

if the row mark of the starting row of pixels of the second partial region in the preset corrected image is greater than the preset number of rows, determining that the remaining space of the storage space meets the preset condition.

In an implementation of the embodiment of the present application, if the remaining space of the storage space does not meet the preset condition, the method may further include:

acquiring the pixel data obtained by scanning with the remaining region of the scanning region as seventh pixel data, and storing the seventh pixel data in the storage space; wherein, the scanning mode of the remaining region is the preset first scanning mode;

correcting the seventh pixel data by using the preset correction algorithm to obtain eighth pixel data, and storing the eighth pixel data in the storage space.

In an implementation of the embodiment of the present application, the process of determining the remaining region may include:

determining the remaining region, based on preset correspondences between rows of pixels of the corrected image and rows of pixels of the image to be corrected, the preset corrected image and the second partial region in the preset corrected image;

wherein, the preset correspondences between the rows of pixels of the corrected image and the rows of pixels of the image to be corrected include: row mark correspondences between the rows of pixels of the corrected image and the rows of pixels of the image to be corrected, and scaling factors corresponding to the rows of pixels of the corrected image.

In an implementation of the embodiment of the present application, the step of determining the remaining region, based on preset correspondences between rows of pixels of the corrected image and rows of pixels of the image to be corrected, the preset corrected image and the second partial region in the preset corrected image may include:

determining the row mark of the starting row of pixels of the remaining region, based on the row mark correspondences, the row mark of the starting row of pixels of the second partial region in the preset corrected image, and the height of the second partial region in the preset corrected image;

determining the row mark of the ending row of pixels of the remaining region based on the row mark correspondences and the row mark of the ending row of pixels of the preset corrected image;

determining the column mark of the starting column of pixels of the remaining region, based on the scaling factors, the row mark of the ending row of pixels of the preset corrected image, the width of the preset corrected image, the column mark of the column of pixels where the symmetrical axis, parallel to the ordinate axis, of the preset corrected image is located, and the column mark of the starting column of pixels of the preset corrected image; wherein, the ordinate axis is the ordinate axis of the coordinate system where the preset corrected image is located;

determining the column mark of the ending column of pixels of the remaining region, based on the scaling factors, the row mark of the ending row of pixels of the preset corrected image, the width of the preset corrected image, the column mark of the column of pixels where the symmetrical axis, parallel to the ordinate axis, of the preset corrected image is located, and the column mark of the ending column of pixels of the preset corrected image.

An embodiment of the present application further provides an executable program code, and the executable program code is configured for, when executed, performing the above any image storage method.

It should be noted that the relationship terms used herein, such as "first", "second" and the like are only to distinguish one entity or operation from another entity or operation, but do not necessarily require or imply that there is any actual relationship or order between these entities or operations. Moreover, the terms "include", "comprise", or any other variants thereof are intended to cover a non-exclusive inclusion, such that processes, methods, articles or devices, including a series of elements, include not only those elements that have been listed, but also other elements that are not specifically listed or the elements intrinsic to these processes, methods, articles or devices. Without further limitations, elements limited by the wording "include(s) a/an . . . " or "comprise(s) a/an . . . " do not exclude additional identical elements in the processes, methods, articles or devices, including the listed elements.

All of the embodiments in the description are described in a correlated manner, and identical or similar parts in various embodiments can refer to one another. In addition, the description for each embodiment focuses on the differences from other embodiments. In particular, the embodiments of the apparatus, the device, the computer readable storage medium and the executable program code are described briefly, since they are substantially similar to the embodiment of the method, and the related contents can refer to the description of the embodiment of the method.

The above described embodiments are simply preferable embodiments of the present application, and are not intended to limit the scope of protection of the present application. Any modifications, equivalent alternatives, improvements, or the like within the spirit and principle of the present application shall be included within the scope of protection of the present application.

The invention claimed is:

1. An image storage method, comprising:

acquiring pixel data obtained by scanning with a first partial region of a scanning region as first pixel data, and storing the first pixel data in a storage space; wherein, a scanning mode of the first partial region is a preset first scanning mode;

correcting the first pixel data by using a preset correction algorithm to obtain second pixel data, and storing the second pixel data in the storage space;

acquiring pixel data obtained by scanning with a remaining region of the scanning region as third pixel data, and storing the third pixel data in the storage space; wherein, the remaining region is a region, other than the first partial region, in the scanning region; a scanning mode of the remaining region is a preset second scanning mode, and for the remaining region, the number of pixels obtained by scanning in the preset second scanning mode is less than the number of pixels obtained by scanning in the preset first scanning mode; and correcting the third pixel data by using the preset correction algorithm to obtain fourth pixel data, and storing the fourth pixel data in the storage space.

2. The method of claim 1, wherein, the process of determining the first partial region of the scanning region comprises:

determining the first partial region of the scanning region, based on preset correspondences between rows of pixels of a preset corrected image and rows of pixels of an image to be corrected and a second partial region in the preset corrected image;

wherein, the preset correspondences comprise: row mark correspondences between the rows of pixels of the preset corrected image and the rows of pixels of the image to be corrected, and scaling factors between the rows of pixels of the preset corrected image and the rows of pixels of the image to be corrected.

3. The method of claim 2, wherein, the row mark correspondences between the rows of pixels of the preset corrected image and the rows of pixels of the image to be corrected are expressed by a preset formula, and the preset formula is:

if $y \leq j'(y+1)$, $j$ corresponds to $y$;

wherein, y is a row mark of a y-th row of pixels in the image to be corrected, j is a row mark of a j-th row of pixels in the corrected image, and j' is a row mark of a row of pixels, in the image to be corrected, to which the j-th row of pixels in the corrected image is mapped.

4. The method of claim 2, wherein, the step of determining the first partial region of the scanning region, based on the preset correspondences between the rows of pixels of the preset corrected image and the rows of pixels of the image to be corrected and the second partial region in the preset corrected image comprises:

determining a row mark of a starting row of pixels of the first partial region of the scanning region based on the row mark correspondences and a row mark of a starting row of pixels of the second partial region in the preset corrected image;

determining a row mark of an ending row of pixels of the first partial region based on the row mark correspondences and a row mark of an ending row of pixels of the second partial region;

determining a column mark of the starting column of pixels of the first partial region, based on the scaling factors, the row mark of the ending row of pixels of the second partial region, a width of the second partial region, a column mark of a column of pixels where a symmetry axis, parallel to columns of pixels, of the second partial region is located and a column mark of a starting column of pixels of the second partial region; and determining a column mark of an ending column of pixels of the first partial region, based on the scaling factors, the row mark of the ending row of pixels of the second partial region, the width of the second partial region, the column mark of the column of pixels where the symmetry axis, parallel to the columns of pixels, of the second partial region is located and a column mark of an ending column of pixels of the second partial region.

5. The method of claim 2, wherein, the step of correcting the first pixel data by using a preset correction algorithm to obtain second pixel data comprises:

for each of pixels in the second partial region, determining a target pixel, in the first partial region, corresponding to the pixel, and determining a preset number of reference pixels at a preset distance from the target pixel;

calculating pixel data of the pixel in the second partial region as the second pixel data by processing pixel data of the preset number of the reference pixels using a bilinear difference algorithm.

6. The method of claim 2, wherein, before acquiring the pixel data obtained by scanning with the remaining region of the scanning region as the third pixel data, the method further comprises:

determining the preset number of rows based on widths of pixel rows of the image to be corrected;

determining whether a row mark of a starting row of pixels of the second partial region in the preset corrected image is greater than the preset number of rows;

if the row mark of the starting row of pixels of the second partial region in the preset corrected image is greater than the preset number of rows, performing the step of acquiring the pixel data obtained by scanning with the remaining region of the scanning region as the third pixel data.

7. The method of claim 1, wherein, before acquiring the pixel data obtained by scanning with the remaining region of the scanning region as the third pixel data, the method further comprises:

determining whether a remaining space of the storage space meets a preset condition;

if the remaining space of the storage space meets the preset condition, performing the step of acquiring the pixel data obtained by scanning with the remaining region of the scanning region as the third pixel data.

8. The method of claim 7, wherein the step of determining whether the remaining space of the storage space meets the preset condition comprises:

estimating a first space occupied by storing the third pixel data obtained by scanning with the remaining region, and estimating a second space occupied by storing the fourth pixel data obtained after the third pixel data is corrected by the preset correction algorithm; wherein, the scanning mode of the remaining region is the preset first scanning mode;

determining whether the remaining space of the storage space is less than a sum of the first space and the second space;

if the remaining space of the storage space is less than the sum of the first space and the second space, determining that the remaining space of the storage space meets the preset condition.

9. The method of claim 7, wherein, if the remaining space of the storage space does not meet the preset condition, the method further comprises:

acquiring the pixel data obtained by scanning with the remaining region of the scanning region as seventh pixel data, and storing the seventh pixel data in the storage space; wherein, the scanning mode of the remaining region is the preset first scanning mode;

correcting the seventh pixel data by using the preset correction algorithm to obtain eighth pixel data, and storing the eighth pixel data in the storage space.

10. The method of claim 1, wherein, the process of determining the remaining region comprises:

determining the remaining region, based on preset correspondences between rows of pixels of a preset corrected image and rows of pixels of an image to be corrected, the preset corrected image and a second partial region in the preset corrected image;

wherein, the preset correspondences comprise: row mark correspondences between the rows of pixels of the preset corrected image and the rows of pixels of the image to be corrected, and scaling factors between the rows of pixels of the preset corrected image and the rows of pixels of the image to be corrected.

11. The method of claim 10, wherein, the step of determining the remaining region, based on the preset correspondences between the rows of pixels of the preset corrected image and the rows of pixels of the image to be corrected, the preset corrected image and the second partial region in the preset corrected image comprises:

determining a row mark of a starting row of pixels of the remaining region, based on the row mark correspondences, a row mark of a starting row of pixels of the second partial region in the preset corrected image, and a height of the second partial region;

determining a row mark of an ending row of pixels of the remaining region based on the row mark correspondences and a row mark of an ending row of pixels of the preset corrected image;

determining a column mark of a starting column of pixels of the remaining region, based on the scaling factors, the row mark of the ending row of pixels of the preset corrected image, a width of the preset corrected image, a column mark of a column of pixels where a symmetrical axis, parallel to columns of pixels, of the preset corrected image is located, and a column mark of a starting column of pixels of the preset corrected image;

determining a column mark of an ending column of pixels of the remaining region, based on the scaling factors, the row mark of the ending row of pixels of the preset corrected image, the width of the preset corrected image, the column mark of the column of pixels where the symmetrical axis, parallel to the columns of pixels, of the preset corrected image is located, and a column mark of an ending column of pixels of the preset corrected image.

12. An electronic device, comprising: a processor and a memory; wherein,
the memory is configured for storing a computer program;
the processor is configured for implementing steps of the method of claim 1 when executing the computer program stored in the memory.

13. A non-transitory computer readable storage medium, storing a computer program; wherein, the computer program, when executed by a processor, implements steps of the method of claim 1.

14. An executable program code stored in a non-transitory computer readable storage medium, configured for, when executed, performing steps of the method of claim 1.

15. An image storage apparatus, comprising:
an image capture module configured for scanning and capturing an image; and
a processor configured for: acquiring pixel data obtained by scanning with a first partial region of a scanning region as first pixel data, and storing the first pixel data in a storage space; wherein, a scanning mode of the first partial region is a preset first scanning mode; correcting the first pixel data by using a preset correction algorithm to obtain second pixel data, and storing the second pixel data in the storage space; acquiring the pixel data obtained by scanning with a remaining region of the scanning region as third pixel data, and storing the third pixel data in the storage space; wherein, the remaining region is a region, other than the first partial region, in the scanning region; a scanning mode of the remaining region is a preset second scanning mode, and for the remaining region, the number of pixels obtained by scanning in the preset second scanning mode is less than the number of pixels obtained by scanning in the preset first scanning mode; and correcting the third pixel data by using the preset correction algorithm to obtain fourth pixel data, and storing the fourth pixel data in the storage space.

* * * * *

UNITED STATES PATENT AND TRADEMARK OFFICE
CERTIFICATE OF CORRECTION

PATENT NO. : 11,368,648 B2
APPLICATION NO. : 17/050128
DATED : June 21, 2022
INVENTOR(S) : Congyi Hua et al.

It is certified that error appears in the above-identified patent and that said Letters Patent is hereby corrected as shown below:

In the Specification

Please replace "$y \leq j'\langle+1$" with --$y \leq j'\langle y+1$-- (Column 5, Line 42).

Please replace "$\text{Width}(j_{Int}) \times (j_{Int} - y_{Top} + 1)$ ImgBytes−GapBytes" with --$\text{Width}(j_{Int}) \times (y_{Int} - y_{Top} + 1) \rangle \text{Im} gBytes - GapBytes$-- (Column 16, Line 29).

Please replace "$(JtoY[i+1]+1-JtoY[1+1]) \times \text{floor}(Scale[i+1] \times w + 2)\rangle$ ImgBytes−GapBytes," with --$(JtoY[i+1]+1-JtoY[1]+1) \times floor(Scale[i+1] \times w + 2) \rangle \text{Im} gBytes - GapBytes$-- (Column 16, Lines 66-67).

Please replace "T2=⌊$j_{Top}$+h1⌋" with --$T2 = JtoY[j_{Top} + h1]$-- (Column 23, Line 8).

Signed and Sealed this
Twentieth Day of September, 2022

Katherine Kelly Vidal
*Director of the United States Patent and Trademark Office*